US012631760B2

(12) United States Patent
Liu et al.

(10) Patent No.: US 12,631,760 B2
(45) Date of Patent: May 19, 2026

(54) METHOD FOR POSITIONING WITH ADAPTIVE POSITIONING INTEGRITY AND COMMUNICATION APPARATUS

(71) Applicant: HUAWEI TECHNOLOGIES CO., LTD., Shenzhen (CN)

(72) Inventors: Mengting Liu, Beijing (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 539 days.

(21) Appl. No.: 18/066,481

(22) Filed: Dec. 15, 2022

(65) Prior Publication Data

US 2023/0152469 A1      May 18, 2023

Related U.S. Application Data

(63) Continuation of application No. PCT/CN2021/100588, filed on Jun. 17, 2021.

(30) Foreign Application Priority Data

Jun. 18, 2020      (CN) .......................... 202010561221.1

(51) Int. Cl.
| | |
|---|---|
| *G01S 19/01* | (2010.01) |
| *H04L 43/0864* | (2022.01) |
| *H04W 64/00* | (2009.01) |

(52) U.S. Cl.
CPC ........ *G01S 19/015* (2013.01); *H04L 43/0864* (2013.01); *H04W 64/006* (2013.01)

(58) Field of Classification Search
CPC ....... H04W 4/029; H04W 4/02; H04W 64/00; H04W 4/40; H04W 4/027; H04W 4/38;
(Continued)

(56) References Cited

U.S. PATENT DOCUMENTS

| | | |
|---|---|---|
| 9,026,094 B2 | 5/2015 | Siomina et al. |
| 2014/0080506 A1 | 3/2014 | Siomina |
(Continued)

FOREIGN PATENT DOCUMENTS

| | | |
|---|---|---|
| CN | 109474894 A | 3/2019 |
| WO | 2020081377 A1 | 4/2020 |

OTHER PUBLICATIONS

Swift Navigation, Deutsche Telekom,—Motivation-Rel-17 Positioning Integrity[online], 3GPP TSG RAN #86 RP-192750, Dec. 2, 2019, total 9 pages.
(Continued)

*Primary Examiner* — Kwasi Karikari
(74) *Attorney, Agent, or Firm* — HAUPTMAN HAM, LLP

(57) ABSTRACT
A method includes obtaining, by a positioning device, positioning integrity information of a terminal device from an access network device or the terminal device. The positioning integrity information indicates a positioning integrity requirement that is predicted by the access network device or the terminal device and that is of the terminal device in a first scenario. The method also includes performing, by the positioning device based on the positioning integrity information, an operation for positioning the terminal device, to meet the positioning integrity requirement of the terminal device in the first scenario.

17 Claims, 12 Drawing Sheets

(58) Field of Classification Search
CPC ....... H04W 4/025; H04W 24/08; H04W 4/44;
H04W 64/003; H04W 4/33; H04W 92/18;
H04W 36/322; H04W 56/006; H04W
12/63; H04W 36/32; H04W 16/20
See application file for complete search history.

(56) References Cited

U.S. PATENT DOCUMENTS

2017/0006426 A1     1/2017  Fu et al.
2018/0284149 A1*  10/2018  Kommi ................. G01S 5/0264

OTHER PUBLICATIONS

3GPP TSG RAN Meeting #86, RP-193237, "New SID on NR Positioning Enhancements", Qualcomm Incorporated, Sitges, Spain, Dec. 9-12, 2019, total 4 pages.
3GPP TR 22.872 V16.1.0 (Sep. 2018), 3rd Generation Partnership Project, Technical Specification Group Services and System Aspects, Study on positioning use cases, Stage 1(Release 16), total 75 pages.
3GPP TR 38.855 V16.0.0 (Mar. 2019), 3rd Generation Partnership Project, Technical Specification Group Radio Access Network, Study on NR positioning support (Release 16), total 197 pages.
3GPP TS 37.355 V16.0.0 (Mar. 2020), 3rd Generation Partnership Project, Technical Specification Group Radio Access Network, LTE Positioning Protocol (LPP) (Release 16), total 281 pages.
Extended European Search Report issued in corresponding European Application No. 21825746.7, dated Nov. 27, 2023, pp. 1-7.
Japanese Office Action issued in corresponding Japanese Application No. 2022-577687, dated Jan. 9, 2024, pp. 1-6.

* cited by examiner (a)

(b)

(c)

(d)

METHOD FOR POSITIONING WITH ADAPTIVE POSITIONING INTEGRITY AND COMMUNICATION APPARATUS

CROSS-REFERENCE TO RELATED APPLICATIONS

This application is a continuation of International Application No. PCT/CN2021/100588, filed on Jun. 17, 2021, which claims priority to Chinese Patent Application No. 202010561221.1, filed on Jun. 18, 2020. The disclosures of the aforementioned applications are hereby incorporated by reference in their entireties.

TECHNICAL FIELD

This application relates to the positioning field, and more specifically, to a method for positioning with adaptive positioning integrity and a communication apparatus.

BACKGROUND

Generally, integrity (integrity) may be used as an important indicator for measuring reliability of information provided by a system, to ensure that the system can make a correct decision in real time to avoid occurrence of a fault. In a positioning system, research on integrity is mainly focused on a satellite navigation positioning system. This is mainly because the satellite navigation positioning system has a high requirement for positioning accuracy, which is far higher than a radio access technology (radio access technology, RAT)-dependent positioning requirement in the 3rd Generation Partnership Project (the third generation partnership project, 3GPP). However, with evolution of an RAT-dependent positioning technology, positioning accuracy of the positioning system is gradually improved, and integrity becomes an important indicator for studying performance of the positioning system.

The research on integrity has been mature in application of a global positioning system, but a performance indicator directly related to integrity is basically preset. However, in many positioning scenarios, an integrity requirement changes in real time, and cannot be preset. For example, in an intelligent warehousing and logistics system, an automated guided vehicle (automated guided vehicle, AGV) needs to be located in real time and accurately. Unlike an airplane, the AGV does not have a fixed route and has a complex surrounding environment. Therefore, the AGV has different requirements for integrity in different scenarios. For example, during goods sorting, the AGV needs to be aligned with a tail of a conveyor belt to receive goods. In this case, an integrity requirement is not high. During goods placement, an integrity requirement is related to a specification of a goods shelf. In this case, the integrity requirement is generally high. During charging, the AGV needs to be automatically connected to a charging pile. A charging pile in a plug form has a very high integrity requirement.

It can be learned that, in a scenario in which an integrity requirement dynamically changes, the integrity requirement cannot be preset in advance. Otherwise, a requirement of constantly changing integrity cannot be met, and a fault event may occur.

SUMMARY

This application provides a method for positioning with adaptive positioning integrity, to adapt to changes of positioning integrity requirements of a terminal device in different scenarios, thereby effectively avoiding occurrence of a fault event.

According to a first aspect, this application provides a method for positioning with adaptive positioning integrity. The method includes: A positioning device obtains positioning integrity information of a terminal device from an access network device or the terminal device, where the positioning integrity information indicates a positioning integrity requirement that is predicted by the access network device or the terminal device and that is of the terminal device in a first scenario; and the positioning device performs, based on the positioning integrity information, an operation for positioning the terminal device, to meet the positioning integrity requirement of the terminal device in the first scenario.

In the technical solution of this application, for a scenario (scenario) in which a positioning integrity requirement dynamically changes, the positioning device predicts a change of the positioning integrity requirement of the terminal device, and adjusts, based on the predicted positioning integrity requirement, the operation for positioning the terminal device, to meet changes of positioning integrity requirements of the terminal device in different scenarios, thereby effectively avoiding occurrence of a fault event.

With reference to the first aspect, in some implementations of the first aspect, that the positioning device performs, based on the positioning integrity information, an operation for positioning the terminal device includes: The positioning device determines whether the positioning integrity requirement of the terminal device in the first scenario changes relative to a positioning integrity requirement of the terminal device in a second scenario, where the second scenario is a scenario in which the terminal device is located before the positioning device positions the terminal device for the first scenario; and when the positioning integrity requirement of the terminal device in the first scenario changes relative to the positioning integrity requirement of the terminal device in the second scenario, the positioning device performs the operation for positioning the terminal device based on the positioning integrity requirement that is indicated by the positioning integrity information and that is of the terminal device in the first scenario.

The positioning device predicts the positioning integrity requirements of the terminal device in different scenarios, and performs corresponding adjustment, so that the positioning integrity requirement may adapt to a dynamically changing scenario, with no need to maintain high positioning integrity all the time. Therefore, resource utilization and system efficiency can be improved while the positioning integrity requirements in different scenarios are ensured.

With reference to the first aspect, in some implementations of the first aspect, that the positioning device performs the operation for positioning the terminal device based on the positioning integrity requirement that is indicated by the positioning integrity information and that is of the terminal device in the first scenario includes performing at least one of the following operations:

changing a positioning algorithm, where a changed positioning algorithm includes one or more of the following: an UL TDoA-based positioning method, a DL TDoA-based positioning method, an UL-AoA-based positioning method, a DL-AoD-based positioning method, an RTT-based positioning method, an enhanced cell ID-based positioning method, a GNSS-based positioning method, a TB S-based positioning method, a barometric pressure sensor-based positioning method, a WLAN-based positioning method, a BT-based positioning method, and a motion sensor-based positioning method; and adding or changing a reference station for positioning the terminal device.

To adapt to the changes of the positioning integrity requirements of the terminal device for different scenarios, the positioning device may perform adjustment in a plurality of manners such as changing the positioning algorithm, and adding or changing the positioning reference station, and adjustment flexibility is high.

With reference to the first aspect, in some implementations of the first aspect, that a positioning device obtains positioning integrity information of a terminal device from an access network device or the terminal device includes:

The positioning device sends a request assistance data message to the access network device, where the request assistance data message is used to request assistance data required for positioning the terminal device; and the positioning device receives provide positioning assistance data message from the access network device, where the provide assistance data message carries the positioning integrity information; or the positioning device sends a request location information message to the terminal device, where the request location information message is used to request location information of the terminal device or a measurement amount for location calculation; and the positioning device receives a provide location information message from the terminal device, where the provide location information message carries the positioning integrity information.

In a process in which the scenario in which the terminal device is located constantly changes, the positioning device may obtain, from the access network or the terminal device, the positioning integrity requirements that are predicted by the access network device or the terminal device and that are of the terminal device in different scenarios, and perform corresponding adjustment accordingly, to meet the changes of the positioning integrity requirements of the terminal device, and adapt to the dynamically changing scenario.

With reference to the first aspect, in some implementations of the first aspect, the positioning integrity information includes one or more pieces of the following information:

a positioning integrity level;

the positioning integrity requirement; and input data of the first scenario, where the input data of the first scenario includes one or more of the following: an environment, a time, and a location of the to-be-positioned terminal device.

The positioning integrity information may be in a plurality of forms, which can improve flexibility of a manner of obtaining positioning integrity by the positioning device.

With reference to the first aspect, in some implementations of the first aspect, when the positioning integrity requirement of the terminal device in the first scenario changes relative to the positioning integrity requirement of the terminal device in the second scenario, the method further includes: The positioning device sends first indication information to the terminal device and/or the access network device, where the first indication information indicates the terminal device and/or the access network device to use a positioning method that meets the positioning integrity requirement of the terminal device in the first scenario.

To adapt to the changes of the positioning integrity requirements of the terminal device in different scenarios, in addition to performing corresponding adjustment by the positioning device to adapt to the changes, the positioning device may further notify the access network and/or the terminal device of performing adjustment that adapts to the changes of the positioning integrity, to assist the positioning device in positioning, thereby improving an adaptability and an adjustment capability of a positioning system for the changes of the positioning integrity requirements.

According to a second aspect, this application provides a method for positioning with adaptive positioning integrity. The method includes: A terminal device obtains positioning integrity information, where the positioning integrity information indicates a positioning integrity requirement of the terminal device in a first scenario; and the terminal device performs, based on the positioning integrity information, an operation for positioning the terminal device, or performs an operation for assisting a positioning device in positioning the terminal device, to meet the positioning integrity requirement of the terminal device in the first scenario.

With reference to the second aspect, in some implementations of the second aspect, that the terminal device performs, based on the positioning integrity information, an operation for positioning the terminal device, or performs an operation for assisting a positioning device in positioning the terminal device includes:

The positioning device determines whether the positioning integrity requirement of the terminal device in the first scenario changes relative to a positioning integrity requirement of the terminal device in a second scenario, where the second scenario is a scenario in which the terminal device is located before the positioning device positions the terminal device for the first scenario; and when the positioning integrity requirement of the terminal device in the first scenario changes relative to the positioning integrity requirement of the terminal device in the second scenario, the terminal device performs, based on the positioning integrity requirement that is indicated by the positioning integrity information and that is of the terminal device in the first scenario, the operation for positioning the terminal device, or performs the operation for assisting the positioning device in positioning the terminal device.

With reference to the second aspect, in some implementations of the second aspect, that the terminal device performs the operation for positioning the terminal device, or performs the operation for assisting the positioning device in positioning the terminal device includes performing at least one of the following operations:

adjusting a mode of measuring a positioning reference signal PRS; and adjusting a mode of monitoring the PRS.

With reference to the second aspect, in some implementations of the second aspect, that a terminal device obtains positioning integrity information includes:

The terminal device receives a radio resource control RRC message from an access network device, where the RRC message carries the positioning integrity information; or the terminal device obtains input data of the first scenario; and the terminal device obtains the positioning integrity requirement of the terminal device in the first scenario through prediction based on the input data of the first scenario and a pre-stored mapping relationship between the positioning integrity requirement and an influencing factor of positioning integrity.

With reference to the second aspect, in some implementations of the second aspect, when the terminal device performs, based on the positioning integrity information, the operation for assisting the positioning device in positioning the terminal device, the method further includes:

The terminal device receives first indication information from the positioning device, where the first indication information indicates the terminal device to use a positioning method that meets the positioning integrity requirement of the terminal device in the first scenario, to assist the positioning device in positioning the terminal device.

With reference to the second aspect, in some implementations of the second aspect, when the terminal device performs, based on the positioning integrity information, the operation for positioning the terminal device, the method further includes:

The terminal device sends second indication information to the positioning device and/or the access network device, where the second indication information indicates the positioning device and/or the access network device to use a positioning method that meets the positioning integrity requirement of the terminal device in the first scenario.

According to a third aspect, this application provides a method for positioning with adaptive positioning integrity. The method includes: An access network device receives indication information from a terminal device or a positioning device, where the indication information indicates the access network device to use a positioning method that meets a positioning integrity requirement of the terminal device in a first scenario; and the access network device performs, based on the indication information, an operation for assisting the terminal device or the positioning device in positioning the terminal device, to meet the positioning integrity requirement of the terminal device in the first scenario.

With reference to the third aspect, in some implementations of the third aspect, that the access network device performs, based on the indication information, an operation for assisting the terminal device or the positioning device in positioning the terminal device includes performing at least one of the following operations:

adjusting a bandwidth for sending a positioning reference signal;

adjusting a power for sending the positioning reference signal; and adjusting a configuration mode of the positioning reference signal, where different configuration modes of the positioning reference signal correspond to different positioning integrity levels.

It should be noted that the "positioning reference signal" herein is generally a reference signal used for positioning, and is not limited to an uplink signal used for positioning or a downlink signal used for positioning. For example, the positioning reference signal may be specifically a downlink positioning reference signal PRS, or may be an uplink positioning reference signal, for example, a demodulation reference signal (sounding reference signal, SRS). This is not limited in this application.

Therefore, in this embodiment, that the RAN adjusts the bandwidth, the transmit power, the configuration mode, or the like of the positioning reference signal may be that the RAN adjusts the transmit bandwidth, the transmit power, the configuration mode, or the like of the PRS, or may be that the RAN adjusts an occupied bandwidth, a transmit power, a configuration mode, or the like of the SRS.

With reference to the third aspect, in some implementations of the third aspect, before the access network device receives the indication information from the terminal device or the positioning device, the method further includes: The access network device obtains positioning integrity information of the terminal device, where the positioning integrity information indicates the positioning integrity requirement of the terminal device in the first scenario; and the access network device sends an RRC message to the terminal device, where the RRC message carries the positioning integrity information.

With reference to the third aspect, in some implementations of the third aspect, that the access network device obtains the integrity information of the terminal device includes: The access network device obtains input data of the first scenario; and the access network device obtains the positioning integrity requirement of the terminal device in the first scenario through prediction based on the input data of the first scenario and a pre-stored mapping relationship between positioning integrity and an influencing factor of the positioning integrity.

In some implementations of the foregoing first aspect to the third aspect, the positioning integrity information includes one or more pieces of the following information:

the positioning integrity requirement; and the input data of the first scenario, where the input data of the first scenario includes one or more of the following: an environment, a time, and a location of the to-be-positioned terminal device.

In some implementations of the foregoing first aspect to the third aspect, a measurement indicator of the positioning integrity requirement indicated by the positioning integrity information includes one or more of the following:

an alert limit, a time to alert, an integrity risk, and a protection level.

For a technical effect of the second aspect, the third aspect, or an implementation of the second aspect or the third aspect, refer to a corresponding solution of the first aspect. Details are not described again.

According to a fourth aspect, this application provides a communication apparatus. The communication apparatus has a function of implementing the method in the first aspect or any possible implementation of the first aspect. The function may be implemented by hardware, or may be implemented by hardware executing corresponding software. The hardware or the software includes one or more units corresponding to the foregoing function.

According to a fifth aspect, this application provides a communication apparatus. The communication apparatus has a function of implementing the method in the second aspect or any possible implementation of the second aspect. The function may be implemented by hardware, or may be implemented by hardware executing corresponding software. The hardware or the software includes one or more units corresponding to the foregoing function.

According to a sixth aspect, this application provides a communication apparatus. The communication apparatus has a function of implementing the method in the third aspect or any possible implementation of the third aspect. The function may be implemented by hardware, or may be implemented by hardware executing corresponding software. The hardware or the software includes one or more units corresponding to the foregoing function.

According to a seventh aspect, this application provides a network device, including a processor, a memory, and a transceiver. The memory is configured to store a computer program. The processor is configured to invoke and run the computer program stored in the memory, and control the transceiver to send/receive a signal, so that the communication device performs the method in the first aspect or any possible implementation of the first aspect.

According to an eighth aspect, this application provides a terminal device, including a processor, a memory, and a transceiver. The memory is configured to store a computer program. The processor is configured to invoke and run the computer program stored in the memory, and control the transceiver to send/receive a signal, so that the communication device performs the method in the second aspect or any possible implementation of the second aspect.

According to a ninth aspect, this application provides a network device, including a processor, a memory, and a transceiver. The memory is configured to store a computer program. The processor is configured to invoke and run the computer program stored in the memory, and control the transceiver to send/receive a signal, so that the communication device performs the method in the third aspect or any possible implementation of the third aspect.

According to a tenth aspect, this application provides a communication apparatus, including a processor and a communication interface. The communication interface is configured to receive a signal and transmit the received signal to the processor, and the processor processes the signal, so that the method in the first aspect or any possible implementation of the first aspect is performed.

According to an eleventh aspect, this application provides a communication apparatus, including a processor and a communication interface. The communication interface is configured to receive a signal and transmit the received signal to the processor, and the processor processes the signal, so that the method in the second aspect or any possible implementation of the second aspect is performed.

According to a twelfth aspect, this application provides a communication apparatus, including a processor and a communication interface. The communication interface is configured to receive a signal and transmit the received signal to the processor, and the processor processes the signal, so that the method in the third aspect or any possible implementation of the third aspect is performed.

Optionally, the communication interface may be an interface circuit, and the processor may be a processing circuit.

According to a thirteenth aspect, this application provides a computer-readable storage medium, where the computer-readable storage medium stores computer instructions. When the computer instructions are run on a computer, the method in the first aspect or any possible implementation of the first aspect is performed.

According to a fourteenth aspect, this application provides a computer-readable storage medium, where the computer-readable storage medium stores computer instructions. When the computer instructions are run on a computer, the method in the second aspect or any possible implementation of the second aspect is performed.

According to a fifteenth aspect, this application provides a computer-readable storage medium, where the computer-readable storage medium stores computer instructions. When the computer instructions are run on a computer, the method in the third aspect or any possible implementation of the third aspect is performed.

According to a sixteenth aspect, this application provides a computer program product, where the computer program product includes computer program code. When the computer program code is run on a computer, the method in the first aspect or any possible implementation of the first aspect is performed.

According to a seventeenth aspect, this application provides a computer program product, where the computer program product includes computer program code. When the computer program code is run on a computer, the method in the second aspect or any possible implementation of the second aspect is performed.

According to an eighteenth aspect, this application provides a computer program product, where the computer program product includes computer program code. When the computer program code is run on a computer, the method in the third aspect or any possible implementation of the third aspect is performed.

According to a nineteenth aspect, this application provides a wireless communication system, including one or more of the network device according to the seventh aspect, the terminal device according to the eighth aspect, and the network according to the ninth aspect.

DESCRIPTION OF EMBODIMENTS

The following describes technical solutions of this application with reference to accompanying drawings.

The technical solutions of this application are applicable to a positioning system, and in particular, are applicable to a positioning system in which a positioning integrity requirement of a to-be-positioned target dynamically changes, for example, an intelligent warehousing and logistics system.

Figures 1, 2:
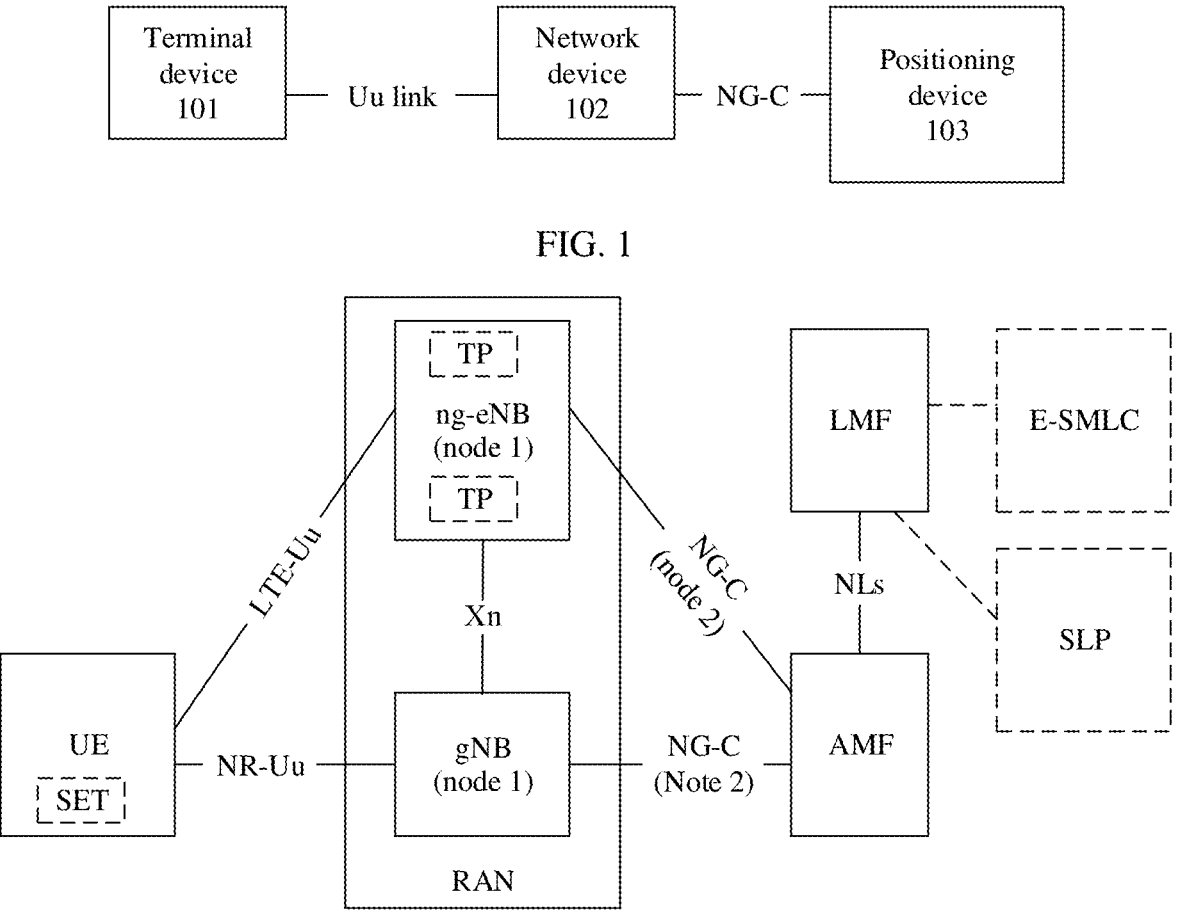
FIG. 1 is a possible positioning system architecture applicable to an embodiment of this application.
FIG. 2 is a schematic diagram of a positioning architecture applicable to an embodiment of this application.

FIG. 1 is a possible positioning system architecture applicable to an embodiment of this application. The positioning system may include a terminal device 101, a network device 102, and a positioning device 103. The positioning device 103 is configured to perform positioning calculation on the terminal device 101 based on a measurement result of another network element (for example, the terminal device 101 or the network device 102) by using a positioning device-based positioning method such as a positioning device-based type described below. Alternatively, the terminal device 101 may perform positioning calculation on the terminal device 101 based on a measurement result of the terminal device or another network element (for example, the network device 102) by using a terminal device-based positioning method such as a UE-based type described below. The network device 102 may measure a positioning reference signal (positioning reference signal, PRS) sent by the terminal device 101, to obtain a measurement result required for positioning the terminal device. The terminal device 101 may alternatively measure a PRS sent by the network device 102, to obtain a measurement result required for positioning the terminal device. Further, in the positioning device-based positioning method, the measurement result may be provided to the positioning device 103, and the positioning device 103 calculates a location of the terminal device based on the measurement result. In the terminal device-based positioning method, after obtaining the measurement result, the terminal device may calculate a location of the terminal device based on the measurement result.

In a possible implementation, the terminal device 101 communicates with the network device 102 by using a cellular link (a Uu link), and the network device 102 communicates with the positioning device 103 by using an NG-C interface.

FIG. 2 is a schematic diagram of a positioning architecture applicable to an embodiment of this application. As shown in FIG. 2, a positioning process is mainly based on a system architecture assisted by the fifth generation core (the fifth generation core, 5GC), a location management function (location management function, LMF), a radio access network (radio access network, RAN), and user equipment (user equipment, UE). Functions of the function entities are as follows:

The LMF is responsible for supporting different types of location services related to target UE, including positioning of the UE and transmitting assistance data to the UE. A control plane and a user plane of the LMF are respectively an enhanced serving mobile location center (enhanced serving mobile location center, E-SMLC) and a secure user plane location platform (secure user plane location platform, SLP). The LMF may exchange information with the RAN, for example, a ng-eNB/gNB, and the UE. For example, information is exchanged between the LMF and the ng-eNB/gNB by using a positioning protocol (new radio positioning protocol annex, NRPPa) message. For example, configuration information of a positioning reference signal (position reference signal, PRS) or a sounding reference signal (sounding reference signal, SRS), cell timing, cell location information, and the like are obtained. For another example, UE capability information, assistance information, measurement information, and the like are transferred between the LMF and the UE by using an LTE positioning protocol (LTE positioning protocol, LPP) message.

An access and mobility management function (access and mobility management function, AMF) may receive a location service request related to the target UE from a 5GC location service (location service, LCS) entity. Alternatively, the AMF may enable some location services on behalf of specific target UE and forwards location service requests to the LMF. After receiving location information returned by the UE, the AMF returns related information to the 5GC LCS entity.

The UE may measure downlink reference signals from the RAN and another source to support positioning.

The RAN may provide measurement information for the target UE and transfer the information to the LMF.

Interfaces between network elements shown in FIG. 2 are merely used as examples.

In the positioning system shown in FIG. 2, the LMF is equivalent to the positioning device 103 shown in FIG. 1.

A method for positioning with adaptive positioning integrity provided in this application may be applied to various communication systems, for example, a long term evolution (long term evolution, LTE) system, an LTE frequency division duplex (frequency division duplex, FDD) system, an LTE time division duplex (time division duplex, TDD) system, a 5G communication system or various future communication systems such as a sixth generation (6th generation, 6G) communication system, a public land mobile network (public land mobile network, PLMN), a device-to-device (device-to-device, D2D) communication system, a machine-to-machine (machine-to-machine, M2M) communication system, an internet of things (Internet of Things, IoT) communication system, or other communication systems.

A terminal device in this application is a device with a wireless transceiver function. For example, the terminal device may include a handheld device having a wireless connection function, or a processing device connected to a wireless modem. The terminal device may communicate with a core network through the radio access network (radio access network, RAN), and exchange voice and/or data with the RAN. The terminal device may be user equipment (user equipment, UE), a wireless terminal device, a mobile terminal device, a device-to-device (device-to-device, D2D) terminal device, a V2X terminal device, a machine-to-machine/machine-type communication (machine-to-machine/machine-type communication, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. The terminal device may further include a mobile phone (or referred to as a "cellular" phone), a computer having a mobile terminal device, a portable, pocket-sized, handheld, or computer built-in mobile apparatus, or the like, for example, a personal communication service (personal communication service, PCS) phone. In addition, the terminal device may alternatively be a limited device, for example, a device with low power consumption, a device with a limited storage capability, or a device with a limited computing capability. For example, the terminal device includes an information sensing device such as a bar code reader, a radio frequency identification (radio frequency identification, RFID) device, a sensor, a global positioning system (global positioning system, GPS), and or a laser scanner. The terminal device may be fixed or movable.

In this application, an apparatus configured to implement a function of the terminal device may be a terminal device, or may be an apparatus that can support the terminal device to implement the function, for example, a chip system. The apparatus may be installed in the terminal device. In this application, the chip system may include a chip, or may include a chip and another discrete component. In the following embodiments, the UE is used as an example for description.

An access network device in this application is a device that provides a wireless communication function for the terminal device. For example, the access network device includes but is not limited to: a next-generation NodeB (next-generation NodeB, gNB) in 5G, an evolved NodeB (evolved NodeB, eNB), a baseband unit (baseband unit, BBU), a transmitting and receiving point (transmitting and receiving point, TRP), a transmitting point (transmitting point, TP), and a mobile switching center. Alternatively, the access network device may be a radio controller, a centralized unit (centralized unit, CU), and/or a distributed unit (distributed unit, DU) in a cloud radio access network (cloud radio access network, CRAN) scenario, or the access network device may be a relay station, an access point, a vehicle-mounted device, a wearable device, a network device in 5G, an access network device in a future evolved PLMN network, or the like.

The terminal device may communicate with a plurality of access network devices in different communication systems. For example, the terminal device may communicate with an access network device that supports an LTE system, or may communicate with an access network device that supports 5G, or may communicate with an access network device in a dual connectivity architecture that supports LTE and 5G. This is not limited in this application.

Similarly, an apparatus configured to implement a function of the access network device may be an access network device, or may be an apparatus that can support the access network device to implement the function, for example, a chip system. The apparatus may be installed in the access network device. In the following embodiments, the access network device is used as an example for description.

A positioning method may be generally classified into the following types based on different location calculation places:

(1) UE-based: The UE is responsible for calculating a location based on assistance data, and may provide a measurement result.

(2) LMF-based: The UE provides measurement but does not calculate a location. The LMF is responsible for calculation based on the assistance data. This positioning method is also called UE-assisted.

(3) Standalone: The UE performs measurement and location calculation without network assistance data.

The positioning method provided in this application is applicable to the UE-based type, the LMF-based type, and the standalone type. In different positioning types, in this solution, a real-time change of a positioning integrity requirement of the terminal device can be predicted, and a corresponding operation can be performed, to meet real-time changes of positioning integrity requirements of the terminal device in different scenarios.

Optionally, integrity (integrity) in embodiments of this application may also have another name, for example, intactness or completeness. This is not limited in this application. Different names all express a same physical meaning, that is, refer to a trusted program or reliability of a measurement value of a measured parameter. For example, in the positioning system in this application, "positioning integrity" is reliability of a positioning result.

The following separately describes the technical solutions of this application for different positioning types.

Before the method for positioning with adaptive positioning integrity provided in this application is described, a positioning integrity prediction model that needs to be used in a positioning integrity prediction process provided in this application is first described.

The positioning integrity prediction model may be established offline (offline), and positioning integrity prediction may be completed online (online).

offline: Factors that affect positioning integrity are analyzed. For example, the factors that affect positioning integrity may include a location, a time, an environment, and the like of a to-be-positioned object. Optionally, each factor may be further subdivided into factors of a smaller granularity, which is not limited. For example, the environment may be further classified into an indoor environment and an outdoor environment, and the outdoor environment may include weather elements such as a temperature, wind, rain, snow, haze, and cloud. The indoor environment may include an indoor people flow, a goods flow, and the like.

Figure 3:
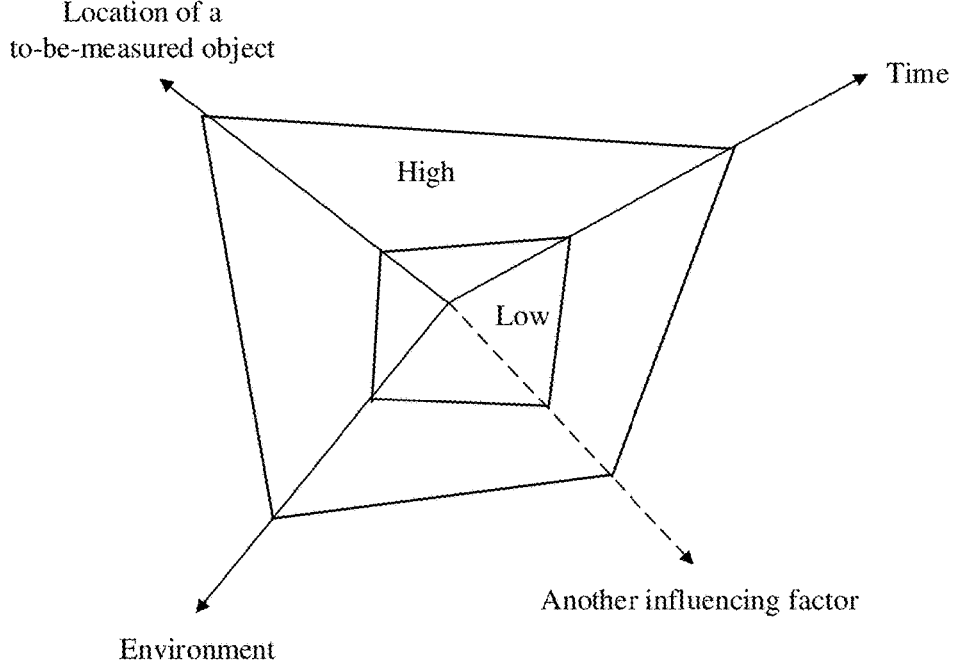
FIG. 3 shows an example of a mapping relationship between positioning integrity and each influencing factor.

For example, the positioning integrity requirement may be set to several different levels, for example, low (low), medium (medium), high (high), and ultra-high (ultra-high), and a mapping relationship between each influencing factor and positioning integrity is obtained by using a method such as machine learning or statistics. As shown in FIG. 3, FIG. 3 shows an example of the mapping relationship between the positioning integrity and each influencing factor. In addition, the mapping relationship is stored. Further, the mapping relationship is stored.

online: A network device (for example, an access network device) or a terminal device obtains input data of a to-be-positioned object (for example, the terminal device) in a specific scenario, and predicts positioning integrity of the to-be-positioned object in the specific scenario based on a mapping relationship that is between the positioning integrity and each influencing factor of the positioning integrity and that is established by using a positioning integrity prediction model.

It should be understood that the factors that affect positioning integrity listed in this application are merely used as examples. In different positioning scenarios, the factors that affect positioning integrity may vary greatly. Therefore, the factors are analyzed based on a specific scenario or environment. However, after a factor that affects positioning integrity is determined, a method for predicting the positioning integrity is the same.

When a scenario in which the to-be-positioned object is located constantly changes, input data of different scenarios is also different. Therefore, when the input data of the different scenarios is used to predict positioning integrity in the different scenarios, obtained positioning integrity are also different from each other. Therefore, when the scenario in which the to-be-positioned object is located changes in real time, a real-time change of the positioning integrity may be predicted by using the prediction model. Correspondingly, for a specific scenario in which the to-be-positioned object is located, the positioning system positions the to-be-positioned object by using a corresponding positioning operation that can meet a positioning integrity requirement in the specific scenario, to adapt to a change of positioning integrity.

Figure 4:
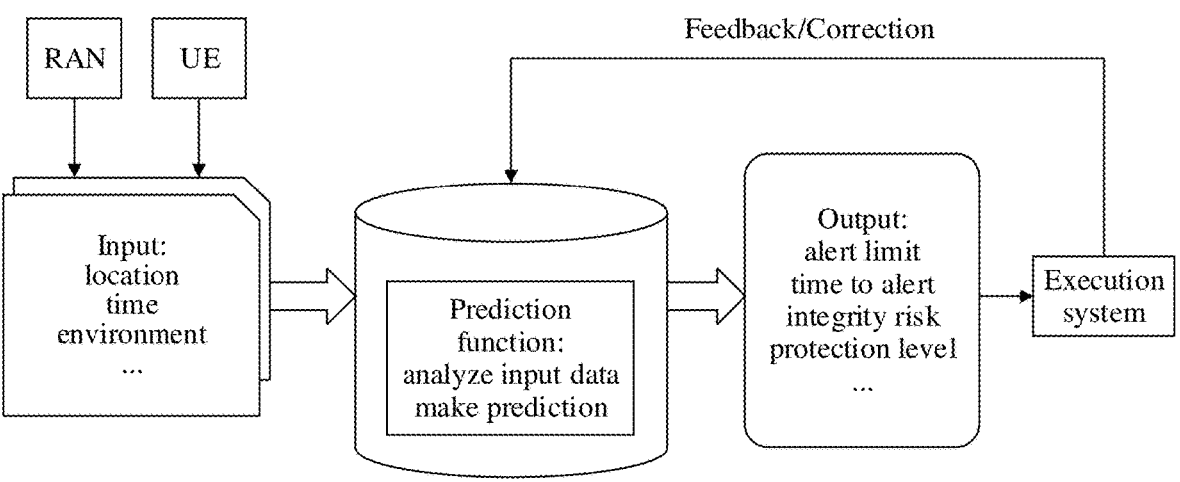
FIG. 4 is a schematic diagram of a positioning integrity prediction model according to this application.

FIG. 4 is a schematic diagram of a positioning integrity prediction model according to this application. As shown in FIG. 4, the prediction model mainly includes four parts: input (input), prediction function (prediction function, PF), output (input), and feedback/correction (feedback/correction). Functions of the various parts are described as follows:

Input: input data that is obtained from a network or a user and that is of each influencing factor of positioning integrity.

For example, an access network (RAN) or UE in a positioning system may obtain input data of each influencing factor of positioning integrity from outside or inside the network in a manner such as instructions, monitoring, measurement, or message exchange, for example, an environment, a time, or a location of a to-be-positioned object.

Prediction function: The input data of each influencing factor is analyzed by using a method such as machine learning or statistical analysis, and the positioning integrity is predicted.

Output is used to output the predicted positioning integrity, which assists the positioning system in performing a corresponding setting and adjustment.

For example, a related indicator representing the positioning integrity may be input, and may include, for example, an alert limit (alert limit, AL), a time to alert (time to alert, TTA), an integrity risk (integrity level, IR), a protection level (protection level, PL), and an error bound (error bounding, EB).

Optionally, a related indicator representing integrity may also be considered as integrity requirement information. Alternatively, positioning integrity requirement information includes one or more of the following:

the alert limit, the time to alert, the integrity risk, and the protection level.

The alert limit may include a horizontal alert limit and a vertical alert limit that respectively represent a maximum allowed horizontal location error or a maximum allowed vertical location error. If the horizontal error is exceeded, it indicates that the positioning system is not applicable to an expected application. A value of this indicator may be preset, and is related to a specific positioning service.

The time to alert is a maximum allowed time from a time at which the positioning system exceeds an allowed error range to a time at which the positioning system generates an alarm. A value of this indicator may be preset, and is related to a specific positioning service.

The integrity risk is a probability that a positioning error exceeds the alarm limit, namely, a probability that a system integrity is risky. A value of this indicator may be preset, and is related to a specific positioning service.

The protection level may include a horizontal protection level and a vertical protection level that respectively represent statistical upper bounds of a positioning position in a horizontal direction and a vertical direction. A background of this indicator is as follows: In a civil aviation system, in an actual operation process, an actual location of an aircraft cannot be known, and therefore an actual positioning error cannot be known. Therefore, a new parameter needs to be provided to measure a possibility that the positioning error exceeds the alert limit. For example, if distribution of the positioning error can be obtained through measurement, the indicator can be calculated through $Prob(PE<PL)=\varepsilon\_PL$, where $\varepsilon\_PL$ is a preset threshold and is also related to a specific positioning service. The PE indicates the positioning error (positioning error).

The error bound is an upper bound of the positioning error, and is used to ensure positioning accuracy.

Feedback/correction: The positioning system feeds back a deviation that occurs in an implementation process to the prediction function to correct a prediction method and process.

An execution system is configured to adaptively adjust some operations for positioning based on a positioning integrity requirement predicted by the PF. For example, a configuration mode of a PRS resource is adjusted, a mode of measuring or monitoring a PRS is adjusted, a working mode is changed, and configuration of a related parameter used for positioning is adjusted.

In addition, the execution system is further configured to feed back a prediction error and correction information, and continuously adjust a prediction function of the PF.

In a specific implementation, the prediction model may be established offline and pre-stored by a device (for example, an access network device or a terminal device) that performs positioning calculation. When the to-be-positioned object needs to be positioned, input data of each influencing factor in a scenario in which the to-be-positioned object is located is obtained online, positioning integrity in the scenario in which the to-be-positioned object is located is predicted based on the pre-stored prediction model, and the predicted positioning integrity in the scenario is output.

Optionally, in the positioning device-based positioning method, the access network device or the terminal device transfers the predicted positioning integrity to the positioning device by using a corresponding message, so that the positioning device performs positioning calculation. Alternatively, in the terminal device-based positioning method, after obtaining the positioning integrity through prediction, the terminal device may directly use the positioning integrity for positioning calculation.

The following separately describes in detail applications of the technical solutions of this application in the positioning device-based positioning method and the terminal device-based positioning method.

1. Positioning Device-Based (Positioning Device-Based) Positioning Method

In embodiments of this application, the positioning device may be a device that is in the positioning system and that is responsible for performing positioning calculation on the to-be-positioned object (for example, the terminal device). The positioning device may position a target terminal device based on a location service request that is initiated by the UE, the AMF, or the 5GC LCS entity and that is for the target terminal device. During positioning, the positioning device may select a used positioning method based on a positioning capability of the target terminal device. In this application, a name of the positioning device is not limited, for example, the LMF, a location management component (location management component, LMC), or a positioning device that has a function similar to the LMF in a new generation communication system. In the following embodiments, an example in which the positioning device is the LMF is used for description. This is not limited in this application.

Figure 5:
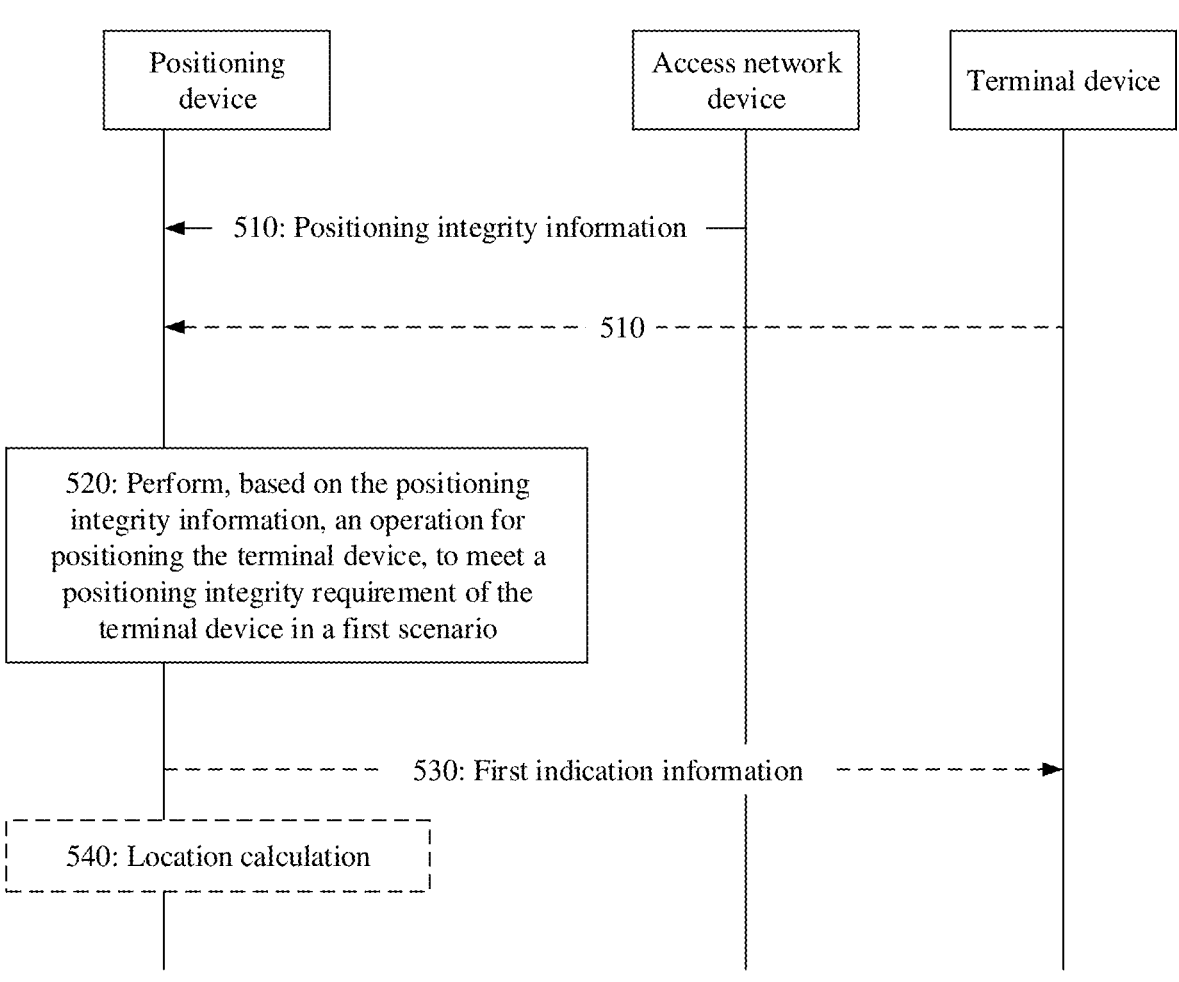
FIG. 5 is a schematic flowchart of a method for positioning with adaptive positioning integrity according to this application.

FIG. 5 is a schematic flowchart of a method for positioning with adaptive positioning integrity according to this application.

510: A positioning device obtains positioning integrity information of a terminal device from an access network device or the terminal device.

The positioning integrity information indicates a positioning integrity requirement that is predicted by the access network device or the terminal device and that is of the terminal device in a first scenario.

Alternatively, the positioning integrity information indicates a positioning integrity requirement of the terminal device in a first scenario.

In this application, the "first scenario" is a scenario in which the terminal device is located when the positioning device positions the terminal device. It may be understood that the first scenario may be any scenario, or the first scenario may represent an example of a scenario in which the to-be-positioned terminal device is located. As described above, there may be many factors that affect positioning integrity. Different input data of factors causes different positioning scenarios.

For example, in an intelligent warehousing and logistics system, in a process of transporting goods, an AGV is located in a different scenario with different time, a location of the AGV, a goods flow in a warehouse, and a people flow.

Optionally, the positioning integrity information may have a plurality of forms.

nal device in the first scenario to the positioning device by using a corresponding message.

For example, in an LMF-based positioning method, the RAN or the UE may report the predicted positioning integrity (integrity level) by using an IE NR-MeasQuality. The IE NR-MeasQuality may be shown as follows:

```
- ASN1START
NR-MeasQuality-r16 ::= SEQUENCE {
        timingMeasQualityValue-r16              INTEGER (0...31),
    timingMeasQualityResolution-r16             ENUMERATED {mdot1, m1, m10, m30, ...}
        integrityLevel-r17                      ENUMERATED {L, M, H, UH, ...}
        ...
}
- ASN1STOP
```

In an implementation, the access network device or the terminal device obtains input data of the first scenario, and provides the input data of the first scenario as the positioning integrity information for the positioning device. For example, the input data of the first scenario includes input data of each influencing factor of the positioning integrity in the first scenario.

In another implementation, the access network device or the terminal device obtains input data of the first scenario, predicts the positioning integrity requirement of the terminal device in the first scenario based on the input data of the first scenario and a pre-stored prediction model, and finally provides, for the positioning device, the predicted positioning integrity requirement of the terminal device in the first scenario as the positioning integrity information.

In yet another implementation, the positioning device obtains the positioning integrity requirement of the terminal device in the first scenario through prediction.

In yet another implementation, the positioning device obtains, from the outside, the positioning integrity requirement of the terminal device in the first scenario.

For example, the "outside" herein may be an external application (application, app), a sensor, or the like.

Optionally, the positioning device obtains the positioning integrity information of the terminal device by using any combination of the foregoing different implementations. For example, the positioning device obtains a part of information of the positioning integrity information through one of the implementations, and obtains the other part of information of the positioning integrity information through another implementation.

For example, the positioning integrity information may be specifically a positioning integrity level. Alternatively, the positioning integrity information may be a value of each indicator (for example, the foregoing alert limit, time to alert, integrity risk, protection level, and error bound) used to represent the positioning integrity.

Optionally, the positioning integrity information includes one or more pieces of the following information:

positioning integrity requirement information;

positioning integrity result information; and the input data of the first scenario, where the input data of the first scenario includes one or more of the following: environment information, time information, and location information of the terminal device.

The integrity result information includes one or more of the following items: information about whether the integrity risk occurs, a positioning error, or an integrity level.

Further, the access network device or the terminal device transmits the positioning integrity information of the termiintegrityLevel represents the integrity level, and the foregoing field uses release-17 (that is, r17) of a communication protocol as an example, and therefore is represented as integrityLevel-r17. For example, the positioning integrity level is divided into several levels, and the levels are enumerated, which may be L (low), M (medium), H (high), and UH (ultra-high).

520: The positioning device performs, based on the positioning integrity information, an operation for positioning the terminal device, to meet the positioning integrity requirement of the terminal device in the first scenario.

Optionally, the positioning integrity information obtained by the positioning device is the input data of the first scenario, and the positioning device predicts, based on the input data of the first scenario, the positioning integrity requirement of the terminal device in the first scenario. Alternatively, the positioning integrity information obtained by the positioning device is the positioning integrity level that is predicted by the access network device or the terminal device and that is of the terminal device in the first scenario, for example, high, low, medium, or ultra high. To adapt to the positioning integrity requirement of the terminal device in the first scenario, the positioning device needs to perform an operation corresponding to the positioning integrity.

For example, the positioning device may perform one of the following operations:

changing a positioning algorithm used for positioning the terminal device, where a changed positioning algorithm includes one or more of the following:

an uplink time difference of arrival (uplink time difference of arrival, UL TDoA)-based positioning method, a downlink time difference of arrival (downlink time difference of arrival, DL TDoA)-based positioning method, an uplink angle of arrival (uplink angle of arrival, UL-AoA)-based positioning method, a downlink angle of departure (uplink angle of departure, DL-AoD)-based positioning method, a round trip time (Multi-round trip time, RTT)-based positioning method, an enhanced cell identifier (enhanced cell identifier)-based positioning method, a global navigation satellite system (global navigation satellite system, GNSS)-based positioning method, a terrestrial beacon system (terrestrial beacon system, TBS)-based positioning method, a barometric pressure sensor-based positioning method, a wireless local area network (wireless local area network, WLAN)-based positioning method, a Bluetooth (bluetooth, BT)-based positioning method, and a motion sensor-based positioning method; and adding or changing a reference station for positioning the terminal device.

Optionally, that the positioning device performs an operation for positioning the terminal device includes performing one or more of the following operations:

changing a positioning method of the terminal device;

changing configuration information of a positioning reference signal; or ending a positioning procedure.

Alternatively, the positioning method is also a positioning algorithm.

It should be noted that, when the positioning device performs positioning calculation based on same input data by using different positioning algorithms, obtained positioning integrity may be different. In other words, different positioning algorithms have different positioning accuracy. Therefore, after obtaining the positioning integrity requirement of the to-be-positioned terminal device in the first scenario, the positioning device selects, from the foregoing positioning algorithms, a positioning algorithm that can meet the predicted positioning integrity requirement, to meet the positioning integrity requirement of the terminal device in the first scenario.

In addition, the positioning device may further add the reference station for positioning, and/or change the reference station for positioning, to meet the positioning integrity requirement of the to-be-positioned terminal device in the first scenario. It should be understood that, a quantity of reference stations used for positioning and different reference stations also affect positioning integrity. For example, generally, a larger quantity of reference stations used for positioning indicates higher positioning integrity, and a smaller quantity of reference stations used for positioning indicates lower positioning integrity. Therefore, that the positioning device changes the quantity of reference stations used for positioning or the reference station may also be used as one of operations that may be used to adapt to a change of the positioning integrity requirement of the to-be-positioned terminal device.

In addition, the positioning device may further notify, through signaling, the RAN and/or the UE of performing a corresponding operation, for example, step 530.

530: The positioning device sends first indication information to the access network device and/or the terminal device.

When receiving the first indication information from the positioning device, the access network device and/or the terminal device perform/performs a corresponding operation based on the first indication information, to assist the positioning device in performing positioning that can meet the positioning integrity requirement of the terminal device in the first scenario.

The first indication information indicates the terminal device or the access network device to use a positioning method that meets the positioning integrity requirement of the terminal in the first scenario.

Alternatively, the first indication information indicates the positioning device to use a positioning method that meets the positioning integrity requirement of the terminal device in the first scenario.

Alternatively, the first indication information indicates the RAN or the UE to use a positioning method corresponding to a positioning integrity level, to assist the positioning device in positioning the terminal device.

For example, in this implementation, the positioning device, the RAN, and the UE may pre-agree on correspondences between different positioning integrity levels and positioning methods, for example, a PRS measurement period and a quantity of used bins, and a bandwidth and a power for sending the PRS that correspond to a high positioning integrity level; and a PRS measurement period and a quantity of used bins, and a bandwidth and a power for sending the PRS that correspond to a low positioning integrity level. After receiving the first indication information from the positioning device, the access network device and/or the UE perform/performs a corresponding operation based on a requirement that is indicated by the first indication information and that is of the positioning integrity level, to assist the positioning device in positioning the terminal device, and enable/enables a positioning result to meet the positioning integrity requirement of the terminal device in the first scenario.

It should be understood that the "corresponding" operation performed by the access network device or the terminal device is an operation that is for positioning the terminal device and that can meet the positioning integrity requirement of the terminal device in the first scenario.

For example, when the RAN receives the first indication information from the positioning device, the RAN may perform one or more of the following operations:

adjusting a bandwidth for sending the positioning reference signal;

adjusting a power for sending the positioning reference signal; and adjusting a configuration mode of the positioning reference signal, where different configuration modes of the positioning reference signal correspond to different positioning integrity levels.

Optionally, the positioning reference signal is generally a reference signal used for positioning, and may be an uplink signal used for positioning or a downlink signal used for positioning. For example, the positioning reference signal may be a PRS or an SRS. This is not limited.

It should be understood that the RAN adjusts the bandwidth, the power, the configuration mode, and the like of the positioning reference signal to meet the positioning integrity requirement of the UE in the first scenario.

For example, when the UE receives the first indication information from the RAN or the positioning device, the UE may perform one or more of the following operations:

adjusting a mode of measuring the PRS; and adjusting a mode of monitoring the PRS.

For example, that the UE performs an operation for assisting the positioning device in positioning the terminal device includes performing one or more of the following operations:

changing the mode of measuring the positioning reference signal;

adjusting the mode of monitoring the positioning reference signal; or ending the positioning procedure.

For example, the mode of measuring the PRS may include a normal mode (normal mode) and a relaxed measurement mode (relaxed measurement mode). The mode of monitoring the PRS may include a normal mode (normal mode) and a discontinuous reception (discontinuous reception, DRX) mode. Parameter settings in different modes are usually different.

For example, the adjusting the mode of measuring the PRS may include changing a PRS measurement period and changing a quantity of bins used for measuring the PRS. Similarly, the adjusting the mode of monitoring the PRS may include changing an on duration time for monitoring the PRS, changing a configuration of a DRX cycle, and the like, where the DRX cycle may be classified into a long cycle, a short cycle, and the like.

Similarly, the foregoing operations performed by the UE are also adjustment performed to meet the positioning integrity requirement of the UE in the first scenario.

540: The positioning device performs location calculation.

It should be noted that a dashed line in FIG. 5 indicates that the step is an optional step and is not necessarily performed. For example, in step 510, the positioning integrity information obtained by the positioning device may be obtained from the RAN or obtained from the UE. In FIG. 5, that the positioning device obtains the positioning integrity information from the RAN is used as an example.

In addition, to meet the positioning integrity requirement of the terminal device in the first scenario, only the positioning device may perform corresponding adjustment, or the positioning device may notify either the RAN or the UE, or notify both the RAN and the UE of performing corresponding adjustment. This is not limited. Therefore, step 530 is also an optional step.

In the technical solution of this application, for a scenario in which a positioning integrity requirement changes in real time, a network device (for example, the access network device or the positioning device) can predict a change of the positioning integrity requirement in advance, and adjust, based on predicted positioning integrity, an operation for positioning the terminal device, to meet positioning integrity requirements of the terminal device in different scenarios, thereby effectively avoiding occurrence of a fault event.

In addition, in the technical solution of this application, the positioning device predicts the real-time change of the positioning integrity, and notifies a related function part of the positioning system of performing corresponding adjustment, to adapt to the positioning integrity requirements of different scenarios, and there is no need to maintain high positioning integrity all the time. Therefore, resource utilization and system efficiency can be improved while the positioning integrity requirements in different scenarios are ensured.

FIG. 5 describes a procedure of predicting positioning integrity of the terminal device in a scenario (for example, the first scenario) and performing a corresponding positioning operation based on the predicted positioning integrity, to meet a positioning integrity requirement of the terminal device in the scenario. When the scenario in which the terminal device is located changes in real time, the positioning integrity requirements of the terminal device in different scenarios can be predicted by using the method in this application. In this way, positioning operations that can meet the positioning integrity requirements of the terminal device in the different scenarios can be performed, so that the changes of the positioning integrity in the different scenarios can be adapted, and the method is applicable to a scenario in which the positioning integrity continuously changes.

Figure 6:
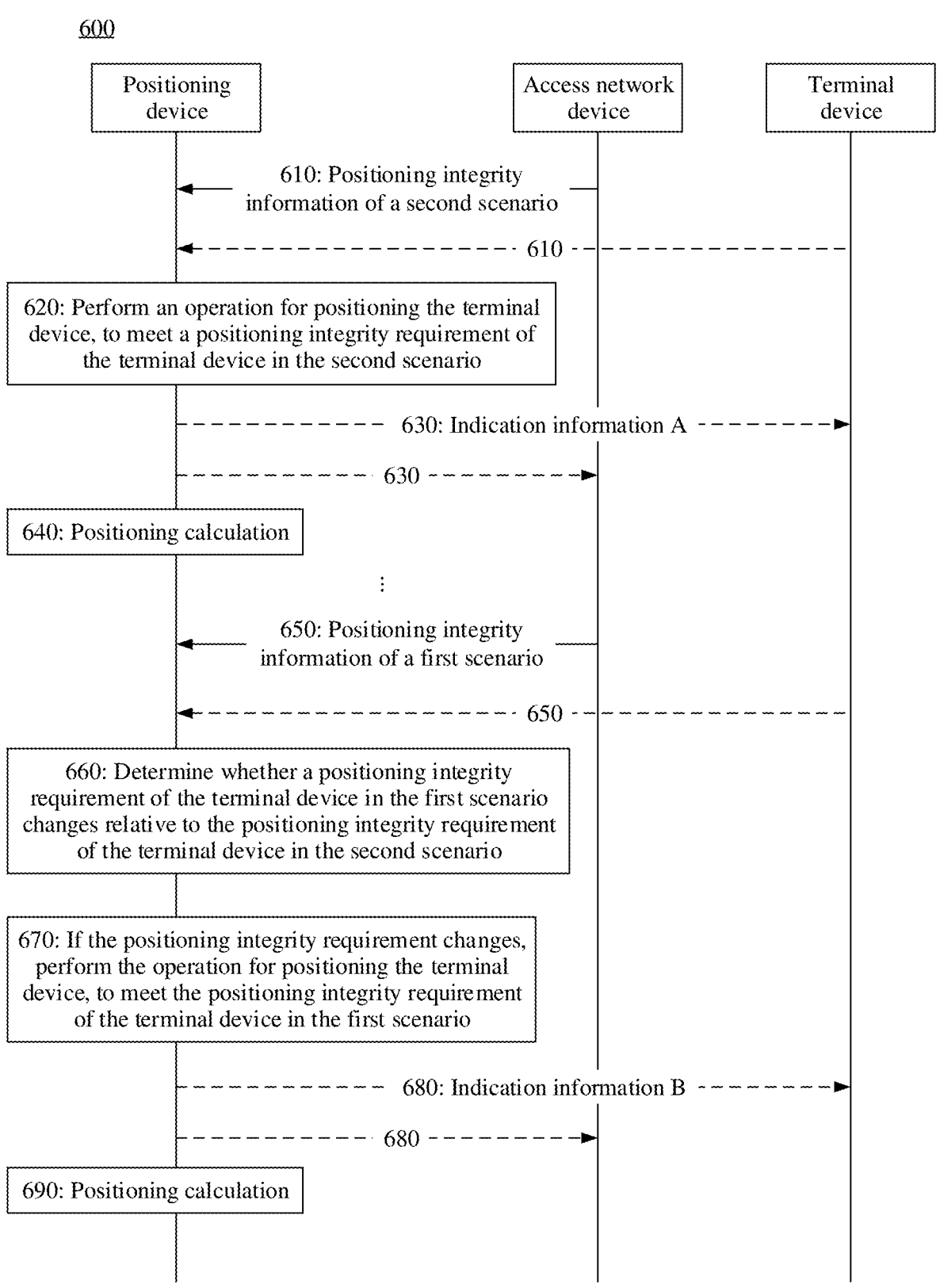
FIG. 6 is an example of a method for positioning with adaptive positioning integrity according to this application.

With reference to FIG. 6, the following describes how to adapt to a change of positioning integrity by using the solution of this application in a process in which the terminal device changes from being in a second scenario to being in the first scenario. For example, in FIG. 6, a positioning device-based positioning method is used as an example for description.

FIG. 6 is an example of a method for positioning with adaptive positioning integrity according to this application.

610: A positioning device obtains positioning integrity information of the second scenario from an access network device or a terminal device.

The positioning integrity information of the second scenario indicates a positioning integrity requirement of the to-be-positioned terminal device in the second scenario. In other words, the positioning integrity information of the second scenario indicates the positioning integrity requirement of the terminal device in the second scenario. It should be understood that the second scenario is a scenario in which the terminal device is located before the positioning device positions the terminal device for the first scenario. In other words, positioning performed by the positioning device on the terminal device based on the second scenario is previous positioning performed by the positioning device on the terminal device based on the first scenario.

In FIG. 6, an example in which the positioning device obtains the positioning integrity information of the second scenario from the access network device is used. Optionally, the positioning device may alternatively obtain the positioning integrity information of the second scenario from the terminal device, as shown in step 610 shown by a dashed line.

For description of the positioning integrity information, refer to the foregoing description. Details are not described herein again.

620: The positioning device performs, based on the positioning integrity information in the second scenario, an operation for positioning the terminal device, to meet the positioning integrity requirement of the terminal device in the second scenario.

For example, the positioning device may use a positioning algorithm corresponding to positioning integrity in the second scenario, select a proper quantity of reference stations used for positioning, and the like. Refer to the foregoing description, and details are not described again.

Optionally, the positioning device may further notify the access network device/or the terminal device of performing a corresponding operation, to assist the positioning device in positioning the terminal device, for example, step 630.

630: The positioning device sends indication information A to the access network device and/or the terminal device, where the indication information A indicates the positioning device to use a positioning method that adapts to a positioning integrity level of the second scenario.

When receiving the indication information A from the positioning device, the access network device may cooperate with the positioning method used by the positioning device by configuring a bandwidth and a power for sending a PRS.

Similarly, when receiving the indication information A from the positioning device, the terminal device may cooperate with the positioning method used by the positioning device by selecting a PRS measurement period, a quantity of bins that need to be measured, a DRX cycle, and the like.

640: The positioning device performs positioning calculation on the terminal device.

The positioning device obtains a measurement result of the PRS with assistance of the access network device (including a selected reference station for positioning) and the terminal device, and performs positioning calculation on the terminal device for the second scenario by using the selected positioning algorithm. A positioning result obtained in this way can meet the positioning integrity requirement of the terminal device in the second scenario.

It is assumed that the scenario in which the terminal device is located changes from the second scenario to the first scenario. It should be understood that, due to a change of the scenario, input data of influencing factors of positioning integrity in different scenarios also changes. In a new scenario, a positioning integrity requirement of the terminal device may also change.

650: The positioning device obtains positioning integrity information of the first scenario from the access network device or the terminal device.

The positioning integrity information of the first scenario indicates a positioning integrity requirement of the to-be-positioned terminal device in the first scenario. In other words, the positioning integrity information of the first scenario indicates a positioning integrity requirement of the terminal device in the first scenario.

660: The positioning device determines whether the positioning integrity requirement of the terminal device in the first scenario changes relative to the positioning integrity requirement of the terminal device in the second scenario.

In a possible case, the positioning integrity requirement of the terminal device in the first scenario does not change relative to the positioning integrity requirement of the terminal device in the second scenario.

For example, the positioning integrity level of the second scenario is high (high), and a positioning integrity level of the first scenario is still high. Alternatively, the positioning integrity level of the second scenario is medium (medium), and the positioning integrity level of the first scenario is still medium.

In this case, the positioning device may continue to perform the operation for positioning the terminal device in step 620, in other words, the positioning algorithm used when the terminal device is positioned for the second scenario, the reference station for positioning, and the like do not need to be changed. In addition, the positioning device does not need to notify the RAN and the UE of performing adjustment. In other words, the RAN and the UE also continue to keep positioning operations used in the second scenario unchanged.

When the positioning device, the access network device, and the UE do not adjust the positioning operations, the terminal device is positioned for the first scenario, and an obtained positioning result can also meet the positioning integrity requirement of the terminal device in the first scenario.

In another possible case, the positioning integrity requirement of the terminal device in the first scenario changes relative to the positioning integrity requirement of the terminal device in the second scenario.

For example, the positioning integrity level of the second scenario is low, and a positioning integrity level of the first scenario is medium. Alternatively, the positioning integrity level of the second scenario is medium, and the positioning integrity level of the first scenario is high. Alternatively, the positioning integrity level of the second scenario is high, and the positioning integrity level of the first scenario is low.

In this case, the positioning device needs to perform corresponding adjustment on the positioning operation, to adapt to the positioning integrity requirement of the terminal device in the new scenario (that is, the first scenario), for example, step 670.

670: The positioning device performs the operation for positioning the terminal device, to meet the positioning integrity requirement of the terminal device in the first scenario.

For example, the positioning device changes the used positioning algorithm, changes the reference station for positioning, or the like.

For example, that the positioning device performs, based on the positioning integrity requirement in the first scenario, the operation for positioning the terminal device includes performing one or more of the following operations:

changing the positioning method used for positioning the terminal device;

changing configuration information of the positioning reference signal; or ending a positioning procedure.

In addition, the positioning device may further notify the RAN and the UE of performing adjustment, for example, step 680.

680: The positioning device sends indication information B to the access network device and/or the terminal device, where the indication information B indicates the positioning device to use a positioning method that adapts to the positioning integrity level of the first scenario.

When receiving the indication information B from the positioning device, the access network device may cooperate with the positioning method used by the positioning device by adjusting the bandwidth, the power, and the like for sending the PRS.

Similarly, when receiving the indication information B from the positioning device, the terminal device may cooperate with the positioning method used by the positioning device by adjusting the PRS measurement period, the quantity of bins that need to be measured, the DRX cycle, and the like.

For example, the positioning integrity requirement of the terminal device in the first scenario changes relative to the positioning integrity requirement of the terminal device in the second scenario, and the positioning device sends the indication information B to the access network device and/or the terminal device, where the indication information B indicates one or more of the following:

the positioning method of the terminal device, the configuration information of the positioning reference signal, ended positioning procedure indication information, and information about a mapping relationship between positioning integrity requirement information and an influencing factor of positioning integrity.

It should be understood that, when the positioning integrity requirement of the first scenario is higher than the positioning integrity requirement of the second scenario, an operation that may be performed by the positioning device may include selecting a positioning algorithm with higher positioning accuracy, increasing a quantity of reference stations for positioning, and the like. Optionally, adjustment performed by the RAN based on the indication information B may include increasing the power and/or the bandwidth for sending the PRS, and the like. Adjustment performed by the UE based on the indication information B may include using a shorter PRS measurement period, using more bins for PRS measurement, increasing an on duration time of measuring the PRS, and the like. That is, relative to the second scenario, the positioning device, the RAN, and the UE all use operations used to meet a higher positioning integrity requirement of the terminal device for the first scenario.

On the contrary, when the positioning integrity requirement of the first scenario is lower than the positioning integrity requirement of the second scenario, based on consideration of improving resource utilization and reducing resource waste, an operation that may be performed by the positioning device includes selecting a positioning algorithm with lower positioning accuracy, reducing the quantity of reference stations for positioning, and the like. Optionally, adjustment performed by the RAN may include reducing the power and/or the bandwidth for sending the PRS, and the like. Adjustment performed by the UE may include using a longer PRS measurement period, reducing the quantity of bins for PRS measurement, and the like. That is, relative to the second scenario, the positioning device, the RAN, and the UE all use operations used to meet a lower positioning integrity requirement of the terminal device for the first scenario.

It can be learned that, when the scenario in which the terminal device is located changes, the positioning device, the access network device, and the UE perform adjustment that adapts to the positioning integrity of the changed scenario, to meet changes of positioning integrity requirements of the terminal device in different scenarios.

690: The positioning device performs positioning calculation on the terminal device.

The positioning device obtains a measurement result of the PRS with assistance of the access network device (including an adjusted reference station for positioning) and the terminal device, and performs positioning calculation on the terminal device for the first scenario by using the adjusted positioning algorithm. A positioning result obtained in this way can meet the positioning integrity requirement of the terminal device in the first scenario.

Figure 7A:
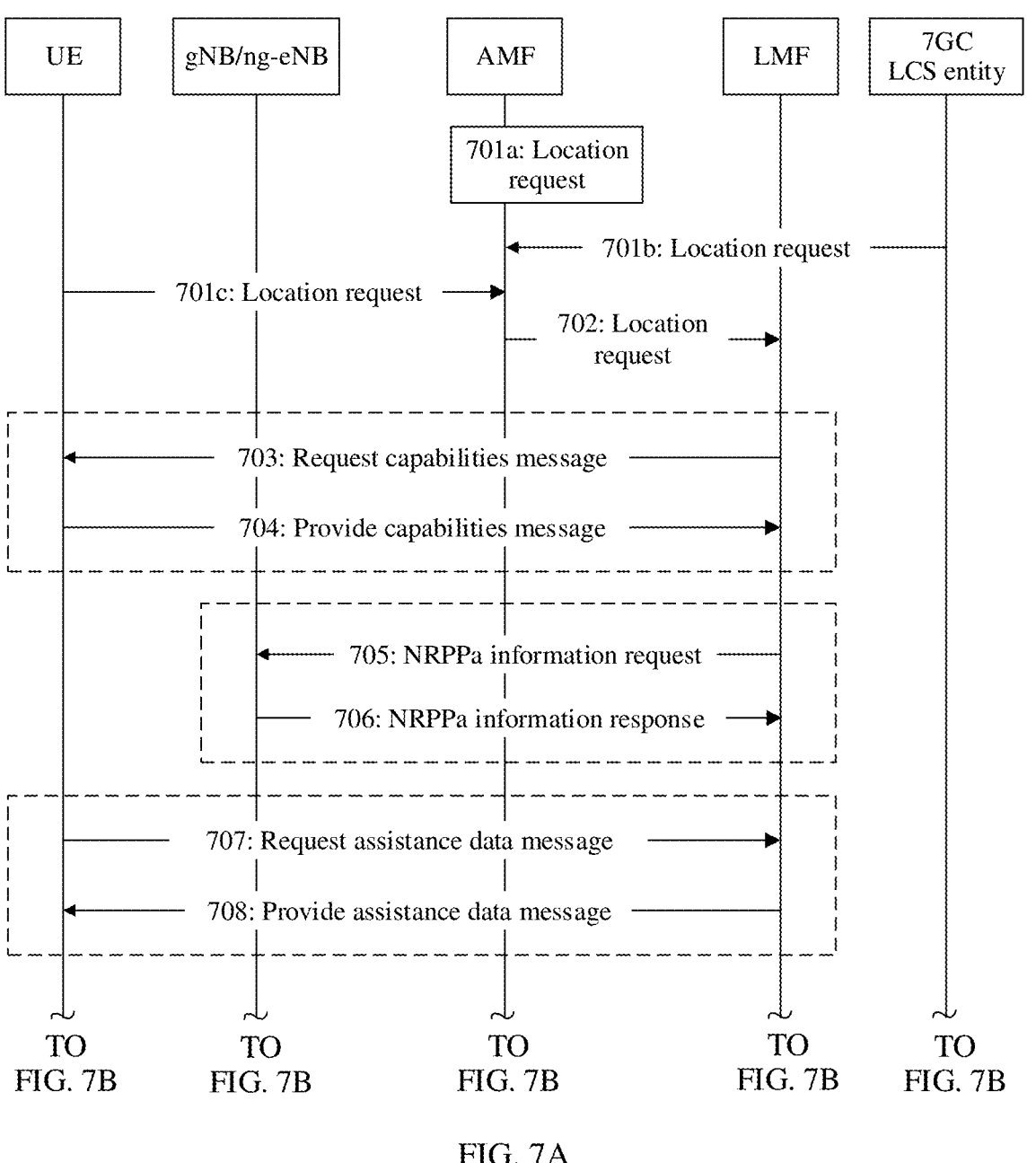
FIG. 7A and FIG. 7B are an example of a positioning method according to this application.
Figure 7B:
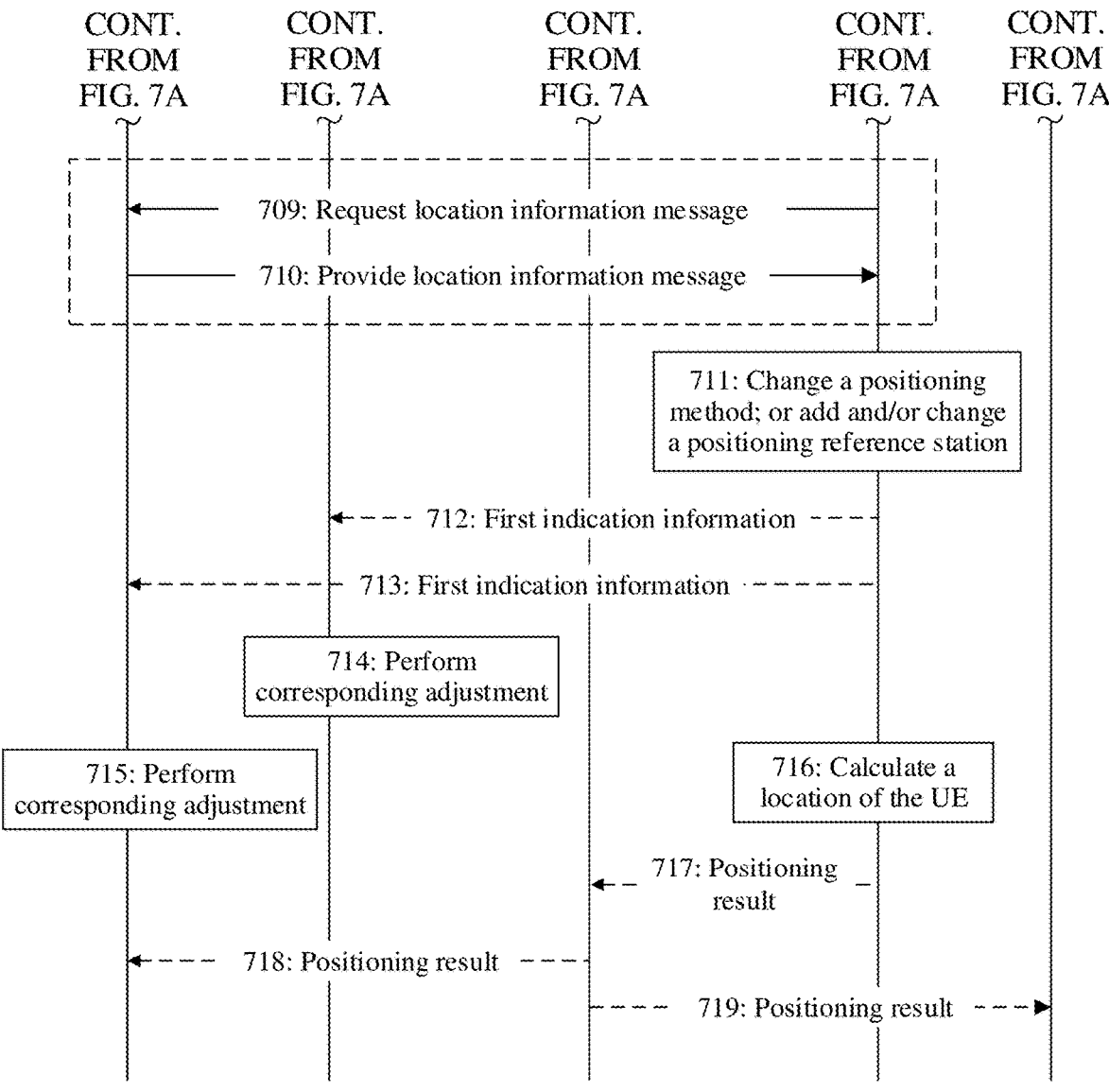

The following uses an example in which the positioning device is the LMF, and with reference to FIG. 7A and FIG. 7B, an overall procedure of a positioning device-based positioning method is described by using an example.

FIG. 7A and FIG. 7B show an example of a positioning method provided in this application.

First, an access network device or a terminal device obtains in advance a mapping relationship between a positioning integrity requirement and each influencing factor of the positioning integrity by using a method such as machine learning or statistics, that is, establishes a positioning integrity prediction model.

701: The LMF receives a location service request (or a location request) for UE.

For example, the LMF may provide a location service for the terminal device based on a plurality of cases. For example, an AMF initiates a location request on behalf of the target UE, for example, step 701a. Alternatively, a 5GC LCS entity, for example, a gateway mobile location center (gateway mobile location center, GMLC), sends a location request related to the target UE to the AMF, for example, step 701b. Alternatively, the UE initiates a location request, for example, step 701c.

702: The AMF sends the location request to the LMF.

703: The LMF sends a request capabilities message to the UE, where the request capabilities message is used to request the UE to report positioning capabilities of the UE.

704: The UE sends a provide capabilities message to the LMF, where the provide capabilities message includes information indicating the positioning capabilities of the UE.

Both the request capabilities message and the provide capabilities message are LTE positioning protocol (LTE positioning protocol, LPP) messages between the UE and the LMF. For example, the request capabilities message may be specifically LPP request capabilities, and the provide capabilities message may be specifically LPP provide capabilities.

It should be understood that the LMF obtains the positioning capabilities of the UE, and therefore, may select a positioning method that adapts to the positioning capabilities of the UE.

705: The LMF sends a request assistance information message to a RAN, where the request assistance information message is used to request the RAN for positioning assistance data.

706: The RAN sends a provide assistance information message to the LMF, where the provide assistance information message includes the positioning assistance data and further includes positioning integrity information of the UE.

Both the request assistance information message and the provide assistance information message are NR positioning protocol (NR positioning protocol annex, NRPPa) messages between the RAN and the LMF. For example, the request assistance information message may be specifically an NRPPa information request, and the provide capabilities message may be specifically an NRPPa information response.

That is, the RAN provides the positioning integrity information of the UE for the LMF as the positioning assistance data.

Positioning assistance data required when different positioning methods are used to perform positioning calculation may be different, and is related to a positioning method selected by the LMF.

Optionally, the positioning integrity information in step 707 may be a positioning integrity level that is predicted by the RAN based on the positioning integrity prediction model and that is of the UE in a first scenario, or may be input data of the first scenario.

707: The UE sends a request assistance data message to the LMF, where the request assistance data message is used to request the LMF for the positioning assistance data.

708: The LMF returns a provide assistance data message to the UE, where the provide assistance data message includes the positioning assistance data.

Both the request assistance data message and the provide assistance data message are LPP messages. For example, the request assistance data message may be specifically LPP request assistance data, and the provide assistance data message may be specifically LPP provide assistance data.

In the foregoing implementation, the RAN may provide the positioning integrity information of the UE to the LMF by using steps 705 to 707. In another implementation, the positioning integrity information of the UE may alternatively be provided by the UE to the LMF, as described in the following steps 709 and 710.

709: The LMF sends a request location message to the UE, where the request location message is used to request location information of the UE.

710: The UE sends a provide location information message to the LMF, where the provide location information message includes the location information of the UE and further includes the positioning integrity information of the UE.

Optionally, the positioning integrity information in step 710 may be a positioning integrity requirement of the UE in the first scenario, or may be the input data of the first scenario. This is not limited.

If the positioning integrity information is the positioning integrity level of the UE in the first scenario, the UE may obtain the positioning integrity level of the UE in the first scenario through prediction based on the input data in the first scenario and the pre-stored positioning integrity prediction model.

Optionally, generally, the LMF may obtain the positioning integrity information of the UE from the RAN by using steps 707 and 708, or obtain the positioning integrity information from the UE by using steps 709 and 710. Either of the two manners may be selected.

Optionally, a manner in which the LMF obtains the positioning integrity information may alternatively be any combination of the foregoing different manners. This is not limited.

In addition, message (or information) names in embodiments are not limited in this application, and the message names are merely used as examples. To distinguish different messages, the messages may alternatively be distinguished by using numbers "first", "second", and the like.

For example, the LMF may obtain the positioning integrity information of the UE in the following process:

The LMF sends first information to the RAN, where the first information is used to request the positioning integrity information of the terminal device; and the LMF receives second information from the RAN, where the second information indicates the positioning integrity information; and/or the LMF sends third information to the UE, where the third information is used to request the positioning integrity information of the UE; and the LMF receives fourth information from the UE, where the fourth information indicates the positioning integrity information of the UE; and/or the LMF obtains the positioning integrity information of the terminal device from the outside.

711: After obtaining the positioning integrity information of the UE in the first scenario from the RAN or the UE, the LMF performs an operation for positioning the UE, to meet the positioning integrity requirement of the UE in the first scenario.

Specifically, when a positioning system (for example, the RAN or the UE) obtains the positioning integrity requirement of the UE in the first scenario through prediction, relative to a case in which a positioning integrity requirement of a scenario before the first scenario changes, the LMF may correspondingly adjust the operation for positioning the terminal device, to adapt to a positioning integrity requirement of the terminal device for a new scenario.

For example, the LMF may perform one or more of the following operations:

changing a positioning method; and adding and/or changing a positioning reference station.

For example, the LMF may perform one or more of the following operations:

changing a positioning method;

changing configuration information of a positioning reference signal; or changing a positioning procedure.

Optionally, in addition to correspondingly adjusting the operation for positioning the UE, the LMF may further notify the RAN and/or the UE of performing a corresponding operation, for example, the following steps 712 and 713, to adaptively meet a change of the positioning integrity requirement of the UE.

712: The LMF sends first indication information to the RAN, where the first indication information indicates the RAN to use a positioning method that meets the positioning integrity requirement of the UE in the first scenario.

713: The LMF sends first indication information to the UE, where the first indication information indicates the UE to use a positioning method that meets the positioning integrity requirement of the UE in the first scenario.

Optionally, the LMF may perform either or both of steps 712 and 713.

When receiving the first indication information from the LMF, the RAN performs step 714.

714: The RAN performs corresponding adjustment based on the first indication information by using the positioning method that meets the positioning integrity requirement of the UE in the first scenario.

For example, that the RAN performs corresponding adjustment includes performing one or more of the following operations:

adjusting a bandwidth for sending the positioning reference signal;

adjusting a power for sending the positioning reference signal; and adjusting a configuration mode of the positioning reference signal, where different configuration modes of the positioning reference signal correspond to different positioning integrity levels.

It should be understood that the RAN performs the foregoing adjustment to adapt to the positioning integrity requirement of the UE in the new scenario.

When receiving the first indication information from the LMF, the RAN performs step 714.

Similarly, when receiving the first indication information from the LMF, the UE performs step 717.

715: The UE performs corresponding adjustment based on the first indication information by using the positioning method that meets the positioning integrity requirement of the UE in the first scenario.

For example, that the UE performs corresponding adjustment includes one or more of the following operations:

adjusting a mode of measuring the PRS; and adjusting a mode of monitoring the PRS.

For example, that the UE performs corresponding adjustment includes one or more of the following operations:

adjusting the mode of measuring the positioning reference signal;

adjusting the mode of monitoring the positioning reference signal; or ending a positioning procedure.

Similarly, the UE also performs the foregoing adjustment to adapt to the positioning integrity requirement of the UE in the new scenario.

716: The LMF calculates a location of the UE.

Further, after the LMF obtains the location of the UE through calculation, the LMF may further provide a positioning result to a network element that initiates the location service request of the UE, for example, the following steps 717 to 719.

717: The LMF sends the positioning result of the UE to the AMF.

718: The AMF sends the positioning result to the 5GC LCS.

719: The AMF sends the positioning result to the UE.

The foregoing describes in detail the positioning device-positioning method, and the following describes a UE-based positioning method.

2. UE-Based (UE-Based) Positioning Method

When the technical solutions of this application are applied to the UE-based positioning method, a positioning process is similar to the foregoing described positioning device-based positioning method. A difference lies in that positioning integrity information obtained by a positioning system is provided for UE, so that positioning calculation is performed at the UE. For other processes, refer to related description of the positioning device-based, and details are not described herein again.

With reference to FIG. 8, the following describes a procedure of a positioning method provided in this application in a UE-based positioning scenario by using an example.

Figure 8A:
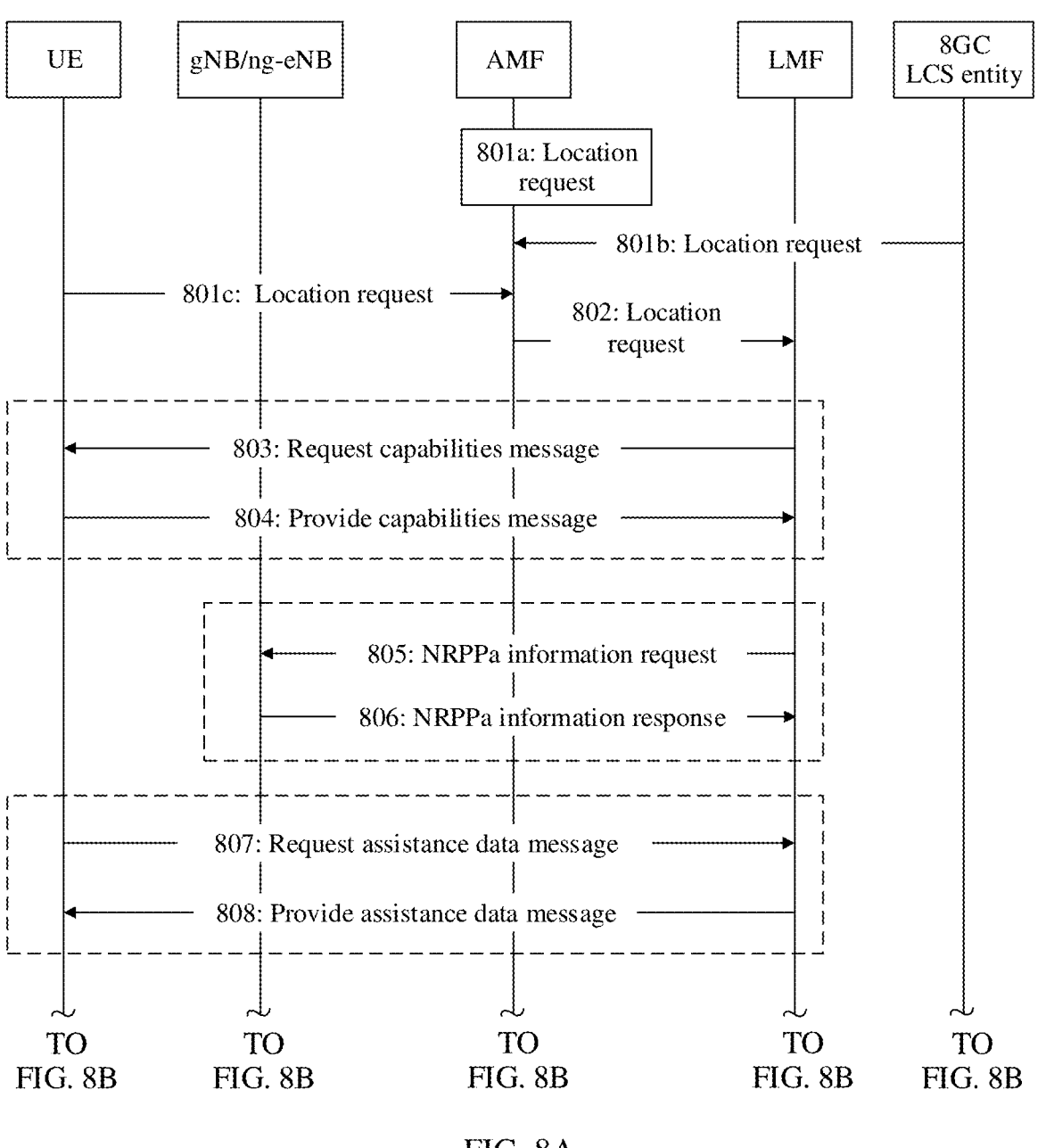
FIG. 8A and FIG. 8B are another example of a positioning method according to this application.
Figure 8B:
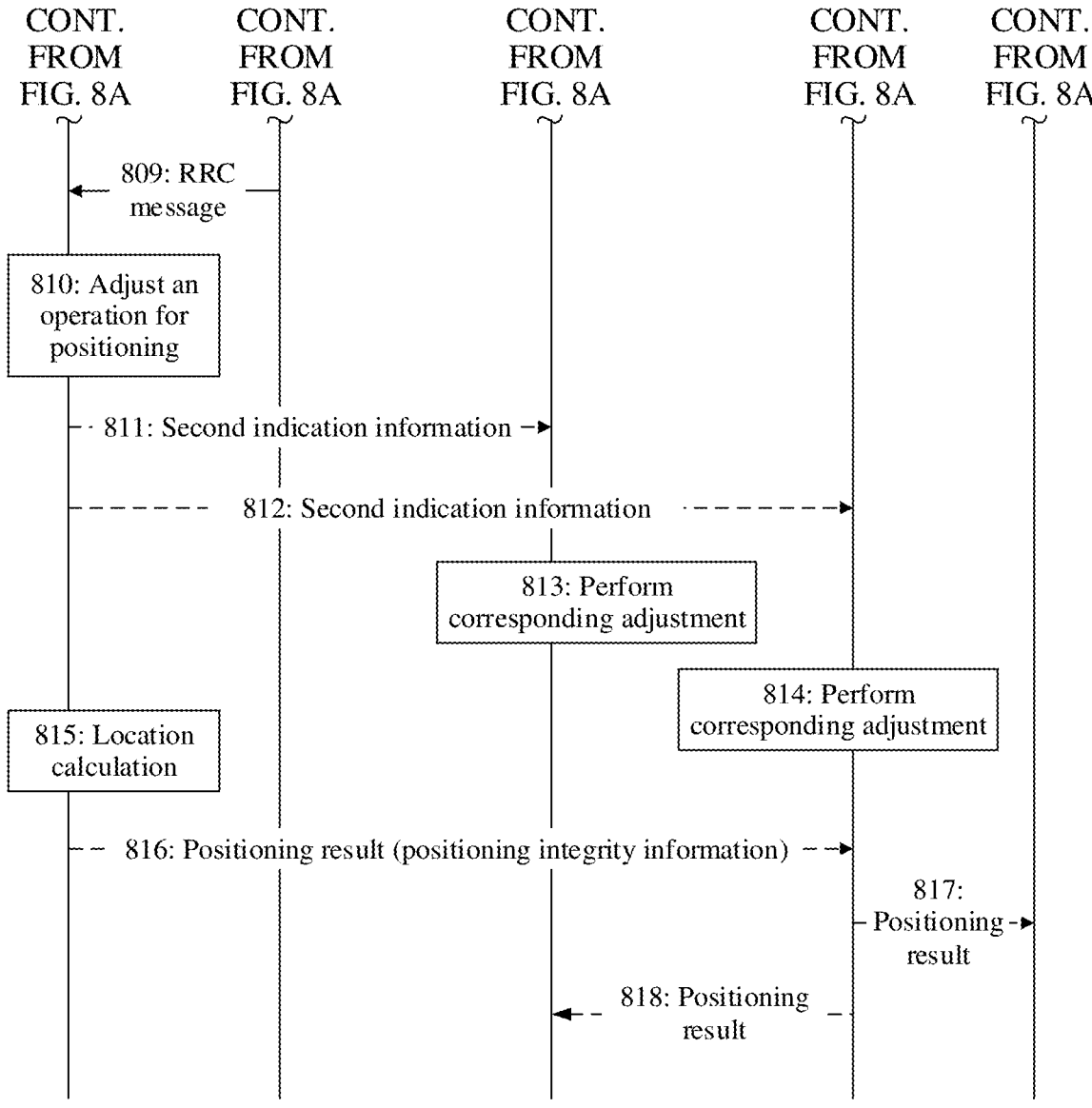

FIG. 8A and FIG. 8B are another example of a positioning method according to this application.

801: An LMF receives a location service request for UE.

For example, an AMF initiates a location request on behalf of the target UE, for example, step 801*a*. Alternatively, a 5GC LCS entity sends a location request related to the target UE to the AMF, for example, step 801*b*. Alternatively, the UE initiates a location request, for example, step 801*c*.

802: The AMF sends the location request to the LMF.

803: The LMF sends a request capabilities message to the UE, where the request capabilities message is used to request the UE to report positioning capabilities.

804: The UE sends a provide capabilities message to the LMF, where the provide capabilities message includes information indicating the positioning capabilities of the UE.

For steps 803 and 804, refer to steps 703 and 704 respectively, and details are not described again.

805: The LMF sends an NRPPa information request message to a RAN, where the NRPPa information request message is used to request the RAN for positioning assistance data.

806: The RAN sends an NRPPa information response message to the LMF, where the NRPPa information response message includes the positioning assistance data.

807: The UE sends a request assistance data message to the LMF, where the request assistance data message is used to request the LMF for the positioning assistance data.

808: The LMF returns a provide assistance data message to the UE, where the provide assistance data message includes the positioning assistance data.

809: The RAN sends an RRC message to the UE, where the RRC message includes positioning integrity information of the UE in a first scenario.

In step 809, the positioning integrity information of the UE in the first scenario may be input data of the UE in the first scenario, or may be a positioning integrity level that is predicted by the RAN based on a pre-stored positioning integrity prediction model and that is of the UE in the first scenario. This is not limited.

In addition, in the example of FIG. 8A and FIG. 8B, the UE obtains the positioning integrity information from the RAN by using the RRC message in step 809. In another implementation, the UE may alternatively pre-store the positioning integrity prediction model, obtain positioning integrity through prediction based on the input data of the first scenario, and directly use the positioning integrity locally without reporting the positioning integrity to a network side, thereby improving efficiency of a positioning system. In other words, the terminal device may predict a positioning integrity requirement of the terminal device (that is, the terminal device) in the first scenario.

In another implementation, the terminal device may alternatively obtain the positioning integrity information of the terminal device from the outside.

For example, the "outside" herein may be an external application (application, app), a sensor, or the like.

The UE obtains the positioning integrity information. If the positioning integrity requirement changes relative to a positioning integrity requirement in a scenario in which the UE is located before the first scenario, the UE may correspondingly adjust an operation for positioning the UE, to adapt to a positioning integrity requirement of the UE for a new scenario, for example, step 810.

810: The UE performs the positioning operation, to meet the positioning integrity requirement of the UE in the first scenario.

For example, the UE may perform one or more of the following operations:

adjusting a mode of measuring a PRS; and adjusting a mode of monitoring the PRS.

For example, that the UE performs corresponding adjustment includes one or more of the following operations:

changing the mode of measuring the positioning reference signal;

adjusting the mode of monitoring the positioning reference signal; or ending a positioning procedure.

Optionally, the UE may further notify the RAN and/or the LMF of performing a corresponding operation, for example, step 811 and step 812. That is, the UE may perform either or both of step 811 and step 812. This is not limited.

811: The UE sends second indication information to the RAN, where the second indication information indicates the RAN to use a positioning method that meets the positioning integrity requirement of the UE in the first scenario.

812: The UE sends second indication information to the LMF, where the second indication information indicates the LMF to use a positioning method that meets the positioning integrity requirement of the UE in the first scenario.

When receiving the second indication information from the UE, the RAN performs step 813.

813: The RAN performs corresponding adjustment based on the second indication information by using the positioning method that meets the positioning integrity requirement of the UE in the first scenario.

For example, that the RAN performs corresponding adjustment includes performing one or more of the following operations:

adjusting a bandwidth for sending the positioning reference signal;

adjusting a power for sending the positioning reference signal; and adjusting a configuration mode of the positioning reference signal, where different configuration modes of the positioning reference signal correspond to different positioning integrity levels.

When receiving the second indication information from the UE, the LMF performs step 814.

814: The LMF performs corresponding adjustment based on the second indication information by using the positioning method that meets the positioning integrity requirement of the UE in the first scenario.

For example, that the LMF performs corresponding adjustment includes performing one or more of the following operations:

adjusting a positioning algorithm; and changing a reference station for positioning, where the change includes increasing or decreasing a quantity of reference stations, changing the reference station, and the like.

815: The UE calculates a location.

Further, after obtaining location information of the UE through calculation, the UE may further provide a positioning result to a network element that requests the location of the UE, for example, steps 816 to 818.

816: The UE provides the positioning result to the LMF

Optionally, in step 816, in addition to providing the positioning result to the LMF, the UE may further provide the predicted positioning integrity information of the UE in the first scenario to the LMF. This is not limited.

817: The LMF sends the positioning result to the 5GC LCS.

818: The LMF provides the positioning result to the AMF.

When the positioning method provided in this application is applied to the UE-based scenario, the UE predicts changes of positioning integrity requirements in different scenarios, and then performs operations that can meet the positioning integrity requirements, to adapt to the changes of the positioning integrity requirements of the UE, thereby effectively avoiding occurrence of a fault event.

In addition, after predicting the changes of the positioning integrity, the UE does not need to report the changes to the LMF, and may directly use the changes locally, thereby effectively reducing a delay.

Similar to the foregoing manner in which the LMF obtains the positioning integrity information, in the embodiment in which the UE obtains the positioning integrity information from the network device in the UE-based positioning scenario, names of messages or information is merely used as examples, and messages may alternatively be distinguished by using numbers.

In addition, the manner in which the UE obtains the positioning integrity information may alternatively be any combination of the foregoing different manners.

For example, a solution in which the terminal device obtains the positioning integrity information from the network side is as follows:

The terminal device sends fifth information to the RAN, where the fifth information is used to request the positioning integrity information of the terminal device; and the terminal device receives sixth information from the RAN, where the sixth information indicates the positioning integrity information of the terminal device; and/or the terminal device sends seventh information to the positioning device (for example, the LMF), where the seventh information is used to request the positioning integrity information of the terminal device; and the terminal device receives eighth information from the positioning device, where the eighth information indicates the positioning integrity information of the terminal device; and/or the terminal device obtains the positioning integrity information of the terminal device from the outside.

Names of all nodes and messages in this application are merely names that are set for ease of description, and names in an actual network may be different. It should not be understood that names of various nodes and messages are limited in this application. On the contrary, any name having a same or similar function as a node or message in this application may be considered as a method in this application or an equivalent replacement thereof.

It should be understood that there is no necessary execution sequence between the steps in all the implementations of this application, and the execution sequence shown in this application is merely an example for description.

In addition, in all implementations of this application, any combination solution of implementations falls within the protection scope of this application.

The following uses an intelligent warehousing and logistics system as an example to briefly describe application of the technical solutions of this application in a scenario in which positioning integrity changes in real time.

In the intelligent warehousing and logistics system, an AGV needs to be positioned in real time and accurately.

Because a surrounding environment of the AGV is also complex, a positioning integrity requirement of the AGV is dynamic. The following assumes that positioning integrity levels in the intelligent warehousing and logistics system are classified into four levels: ultra-high, high, medium, and low.

Figure 9:
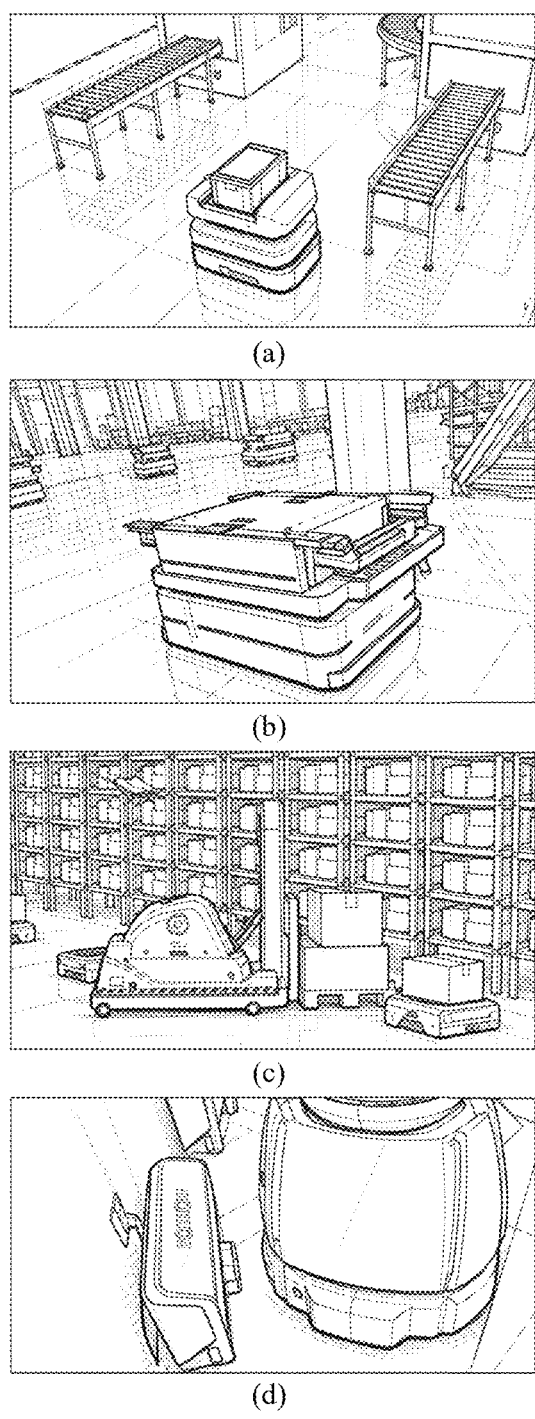
FIG. 9 is a schematic diagram of a scenario change in an intelligent warehousing and logistics system.

FIG. 9 is a schematic diagram of a scenario change in the intelligent warehousing and logistics system.

As shown in (a) in FIG. 9, the AGV is in a scenario of goods sorting. During goods sorting, the AGV needs to be aligned with a tail of a conveyor belt to receive goods. In this case, a positioning integrity requirement is related to a width and a height of the conveyor belt, and positioning integrity belongs to a medium level.

As shown in (b) in FIG. 9, the AGV is in a scenario in which goods are transported. The AGV may need to pass through a passage or go upstairs or downstairs, and need to avoid an obstacle encountered in a transportation process. In this case, a positioning integrity requirement is complex, and is mainly related to factors such as a people flow and a distance between the AGV and an obstacle in the transportation process, and may frequently change between low, medium, and high levels.

As shown in (c) in FIG. 9, the AGV is in a scenario in which goods are placed. In this case, a positioning integrity requirement is related to a specification of a goods shelf, a positioning integrity level also belongs to a high level, and an error bound is generally about dozens of centimeters.

As shown in (d) in FIG. 9, the AVG is in a charging scenario, and the AGV needs to be automatically connected to a charging pile. Currently, the charging pile is usually classified into a charging pile in a contact band form and a charging pile in a plug form. In this case, a positioning integrity requirement is very high. Especially, the charging pile in a plug form may correspond to an error bound of only several centimeters.

It can be found from FIG. 9 that different scenarios have different positioning integrity requirements. In addition, even in a specific scenario, a positioning integrity requirement of the AGV changes. For example, in (b) in FIG. 9, when an obstacle (for example, a person, another AGV, or falling goods) is encountered in a process of transporting goods, the positioning integrity requirement becomes higher. In different times or time periods, different goods flows or people flows also affect the positioning integrity requirement. As a volume of goods increases, liquidity of the AGV increases. Alternatively, a people flow in a working time period is greater than a people flow in a rest time period, and a positioning integrity requirement of the AGV is also higher.

According to the technical solution of this application, the positioning system obtains, in real time, a scenario in which the AGV is located, predicts a positioning integrity requirement of the AGV in the scenario, and performs a corresponding operation to meet the requirement. When the scenario in which the AGV is located continuously changes, the positioning system predicts positioning integrity requirements in different scenarios, and performs adjustment that is adaptive to each scenario, to adapt to a requirement for a dynamic change of positioning integrity.

The foregoing describes the method for positioning with adaptive positioning integrity provided in this application in detail, and the following describes communication apparatuses provided in this application.

Figure 10:
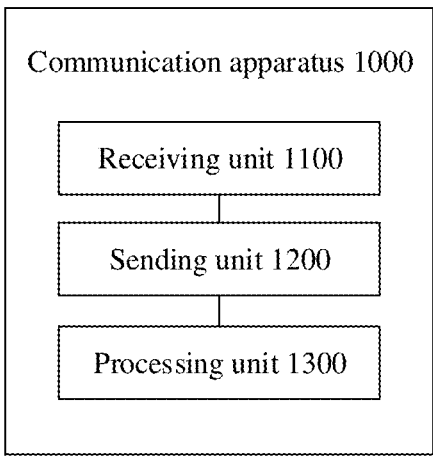
FIG. 10 is a schematic block diagram of a communication apparatus according to this application.

FIG. 10 is a schematic block diagram of a communication apparatus according to this application. As shown in FIG.

10, a communication apparatus 1000 includes a receiving unit 1100, a sending unit 1200, and a processing unit 1300.

The receiving unit 1100 is configured to obtain positioning integrity information of a terminal device from an access network device or the terminal device, where the positioning integrity information indicates a positioning integrity requirement that is predicted by the access network device or the terminal device and that is of the terminal device in a first scenario.

The processing unit 1300 is configured to perform, based on the positioning integrity information, an operation for positioning the terminal device, to meet the positioning integrity requirement of the terminal device in the first scenario.

Optionally, the receiving unit 1100 and the sending unit 1200 may alternatively be integrated into one transceiver unit, and have both receiving and sending functions. This is not limited herein.

In an embodiment, the processing unit 1300 is specifically configured to:

determine whether the positioning integrity requirement of the terminal device in the first scenario changes relative to a positioning integrity requirement of the terminal device in a second scenario, where the second scenario is a scenario in which the terminal device is located before the positioning device positions the terminal device for the first scenario; and when the positioning integrity requirement of the terminal device in the first scenario changes relative to the positioning integrity requirement of the terminal device in the second scenario, perform the operation for positioning the terminal device based on the positioning integrity requirement that is indicated by the positioning integrity information and that is of the terminal device in the first scenario.

In another embodiment, the processing unit 1300 is specifically configured to perform at least one of the following operations:

changing a positioning algorithm used for positioning the terminal device, where a changed positioning algorithm includes one or more of the following:

an UL TDoA-based positioning method, a DL TDoA-based positioning method, an UL-AoA-based positioning method, a DL-AoD-based positioning method, an RTT-based positioning method, an enhanced cell ID-based positioning method, a GNSS-based positioning method, a TBS-based positioning method, a barometric pressure sensor-based positioning method, a WLAN-based positioning method, a BT-based positioning method, and a motion sensor-based positioning method; and adding or changing a reference station for positioning the terminal device.

In another embodiment, the sending unit 1200 is configured to send a request assistance data message to the access network device, where the request assistance data message is used to request assistance data required for positioning the terminal device; and the receiving unit 1100 is configured to receive a provide assistance data message from the access network device, where the provide assistance data message carries the positioning integrity information; or the sending unit 1200 is configured to send a request location information message to the terminal device, where the request location information message is used to request location information of the terminal device or a measurement amount for location calculation; and the receiving unit 1100 is configured to receive a provide location information message from the terminal device, where the provide location information message carries the positioning integrity information.

Optionally, in some embodiments, the positioning integrity information includes one or more pieces of the following information:

the positioning integrity requirement; and input data of the first scenario, where the input data of the first scenario includes one or more of the following: an environment, a time, and a location of the to-be-positioned terminal device.

Optionally, in some embodiments, a measurement indicator of the positioning integrity requirement indicated by the positioning integrity information includes one or more of the following:

an alert limit, a time to alert, an integrity risk, and a protection level.

In another embodiment, the sending unit 1200 is further configured to:

send first indication information to the terminal device and/or the access network device, where the first indication information indicates the terminal device and/or the access network device to use a positioning method that meets the positioning integrity requirement of the terminal device in the first scenario.

In an implementation, the communication apparatus 1000 may be the positioning device in the method embodiment. In this implementation, the receiving unit 1100 may be a receiver, and the sending unit 1200 may be a transmitter. Alternatively, the receiver and the transmitter may be integrated into a transceiver. The processing unit 1300 may be a processing apparatus.

In another implementation, the communication apparatus 1000 may be a chip or an integrated circuit installed in the positioning device. In this implementation, the receiving unit 1100 and the sending unit 1200 may be a communication interface or an interface circuit. For example, the receiving unit 1100 is an input interface or an input circuit, the sending unit 1200 is an output interface or an output circuit, and the processing unit 1300 may be a processing apparatus.

In the foregoing implementations, a function of the processing apparatus may be implemented by hardware, or may be implemented by hardware by executing corresponding software.

For example, the processing apparatus may include one or more memories and one or more processors. The one or more memories are configured to store a computer program. The one or more processors read and execute the computer program stored in the one or more memories, to enable the communication apparatus 1000 to perform the operation and/or processing performed by the positioning device in the method embodiments.

Optionally, the processing apparatus may include only the processor, and the memory configured to store the computer program is located outside the processing apparatus. The processor is connected to the memory through a circuit/wire to read and execute the computer program stored in the memory.

For another example, the processing apparatus may be a chip or an integrated circuit.

Figure 11:
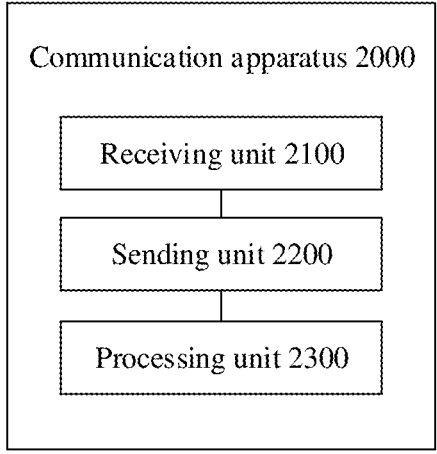
FIG. 11 is a schematic block diagram of another communication apparatus according to this application.

FIG. 11 is a schematic block diagram of a communication apparatus according to this application. As shown in FIG. 11, a communication apparatus 2000 includes a receiving unit 2100, a sending unit 2200, and a processing unit 2300.

The receiving unit 2100 is configured to obtain positioning integrity information, where the positioning integrity information indicates a positioning integrity requirement of a terminal device in a first scenario.

The processing unit 2300 is configured to perform, based on the positioning integrity information, an operation for positioning the terminal device, or perform an operation for assisting a positioning device in positioning the terminal device, to meet the positioning integrity requirement of the terminal device in the first scenario.

Optionally, the receiving unit 2100 and the sending unit 2200 may alternatively be integrated into one transceiver unit, and have both receiving and sending functions. This is not limited herein.

In an embodiment, the processing unit 2300 is specifically configured to:

determine whether the positioning integrity requirement of the terminal device in the first scenario changes relative to a positioning integrity requirement of the terminal device in a second scenario, where the second scenario is a scenario in which the terminal device is located before the positioning device positions the terminal device for the first scenario; and when the positioning integrity requirement of the terminal device in the first scenario changes relative to the positioning integrity requirement of the terminal device in the second scenario, perform, based on the positioning integrity requirement that is indicated by the positioning integrity information and that is of the terminal device in the first scenario, the operation for positioning the terminal device, or perform the operation for assisting the positioning device in positioning the terminal device.

In another embodiment, the processing unit 2300 is specifically configured to perform at least one of the following operations:

adjusting a mode of measuring a PRS; and
adjusting a mode of monitoring the PRS.

In another embodiment, the receiving unit 2100 is specifically configured to receive an RRC message from the access network device, where the RRC message carries the positioning integrity information; or the processing unit 2300 is specifically configured to:
obtain input data of the first scenario; and
obtain the positioning integrity requirement of the terminal device in the first scenario through prediction based on the input data of the first scenario and a pre-stored mapping relationship between positioning integrity and an influencing factor of the positioning integrity.

In some embodiments, the positioning integrity information includes one or more pieces of the following information:

the positioning integrity requirement; and
the input data of the first scenario, where the input data of the first scenario includes one or more of the following: an environment, a time, and a location of the to-be-positioned terminal device.

In some embodiments, a measurement indicator of the positioning integrity requirement indicated by the positioning integrity information includes one or more of the following:

an alert limit, a time to alert, an integrity risk, and a protection level.

In another embodiment, the receiving unit 2100 is further configured to:

receive first indication information from the positioning device, where the first indication information indicates the terminal device to use a positioning method that meets the positioning integrity requirement of the terminal device in the first scenario, to assist the positioning device in positioning the terminal device.

In another embodiment, the sending unit 2200 is further configured to:

send second indication information to the positioning device and/or the access network device, where the second indication information indicates the positioning device and/or the access network device to use a positioning method that meets the positioning integrity requirement of the terminal device in the first scenario.

In an implementation, the communication apparatus 2000 may be the terminal device in the method embodiment. In this implementation, the receiving unit 2100 may be a receiver, and the sending unit 2200 may be a transmitter. Alternatively, the receiver and the transmitter may be integrated into a transceiver. The processing unit 2300 may be a processing apparatus.

In another implementation, the communication apparatus 2000 may be a chip or an integrated circuit installed in the terminal device. In this implementation, the receiving unit 2100 and the sending unit 2200 may be a communication interface or an interface circuit. For example, the receiving unit 2100 is an input interface or an input circuit, the sending unit 2200 is an output interface or an output circuit, and the processing unit 2300 may be a processing apparatus.

In the foregoing implementations, a function of the processing apparatus may be implemented by hardware, or may be implemented by hardware by executing corresponding software.

For example, the processing apparatus may include one or more memories and one or more processors. The one or more memories are configured to store a computer program. The one or more processors read and execute the computer program stored in the one or more memories, to enable the communication apparatus 2000 to perform the operation and/or processing performed by the terminal device in the method embodiments.

Optionally, the processing apparatus may include only the processor, and the memory configured to store the computer program is located outside the processing apparatus. The processor is connected to the memory through a circuit/wire to read and execute the computer program stored in the memory.

For another example, the processing apparatus may be a chip or an integrated circuit.

Figure 12:
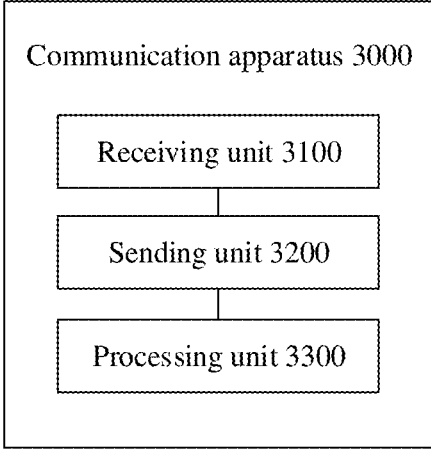
FIG. 12 is a schematic block diagram of another communication apparatus according to this application.

FIG. 12 is a schematic block diagram of a communication apparatus according to this application. As shown in FIG. 12, a communication apparatus 3000 includes a receiving unit 3100, a sending unit 3200, and a processing unit 3300.

The receiving unit 3100 is configured to receive indication information from a terminal device or a positioning device, where the indication information indicates an access network device to use a positioning method that meets a positioning integrity requirement of the terminal device in a first scenario.

The processing unit 3300 is configured to perform, based on the indication information, an operation for assisting the terminal device or the positioning device in positioning the terminal device, to meet the positioning integrity requirement of the terminal in the first scenario.

Optionally, the receiving unit 3100 and the sending unit 3200 may alternatively be integrated into one transceiver unit, and have both receiving and sending functions. This is not limited herein.

In an embodiment, the processing unit 3300 is specifically configured to perform at least one of the following operations:

adjusting a bandwidth for sending a positioning reference signal;

adjusting a power for sending the positioning reference signal; and adjusting a configuration mode of the positioning reference signal, where different configuration modes of the positioning reference signal correspond to different positioning integrity levels.

In another embodiment, the processing unit 3300 is further configured to obtain integrity information of the terminal device, where the positioning integrity information indicates the positioning integrity requirement of the terminal device in the first scenario; and the sending unit 3200 is further configured to send an RRC message to the terminal device, where the RRC message carries the positioning integrity information.

In another embodiment, the processing unit 3300 is specifically configured to:

obtain input data of the first scenario; and obtain the positioning integrity requirement of the terminal device in the first scenario through prediction based on the input data of the first scenario and a pre-stored mapping relationship between positioning integrity and an influencing factor of the positioning integrity.

In some embodiments, the positioning integrity information includes one or more pieces of the following information:

the positioning integrity requirement; and the input data of the first scenario, where the input data of the first scenario includes one or more of the following: an environment, a time, and a location of the to-be-positioned terminal device.

In some embodiments, a measurement indicator of the positioning integrity requirement indicated by the positioning integrity information includes one or more of the following:

an alert limit, a time to alert, an integrity risk, and a protection level.

In an implementation, the communication apparatus 3000 may be the access network device in the method embodiment. In this implementation, the receiving unit 3100 may be a receiver, and the sending unit 3200 may be a transmitter. Alternatively, the receiver and the transmitter may be integrated into a transceiver. The processing unit 3300 may be a processing apparatus.

In another implementation, the communication apparatus 3000 may be a chip or an integrated circuit installed in the access network device. In this implementation, the receiving unit 3100 and the sending unit 3200 may be a communication interface or an interface circuit. For example, the receiving unit 3100 is an input interface or an input circuit, the sending unit 3200 is an output interface or an output circuit, and the processing unit 3300 may be a processing apparatus.

In the foregoing implementations, a function of the processing apparatus may be implemented by hardware, or may be implemented by hardware by executing corresponding software.

For example, the processing apparatus may include one or more memories and one or more processors. The one or more memories are configured to store a computer program. The one or more processors read and execute the computer program stored in the one or more memories, to enable the communication apparatus 3000 to perform the operation and/or processing performed by the access network device in the method embodiments.

Optionally, the processing apparatus may include only the processor, and the memory configured to store the computer program is located outside the processing apparatus. The processor is connected to the memory through a circuit/wire to read and execute the computer program stored in the memory.

For another example, the processing apparatus may be a chip or an integrated circuit.

Figure 13:
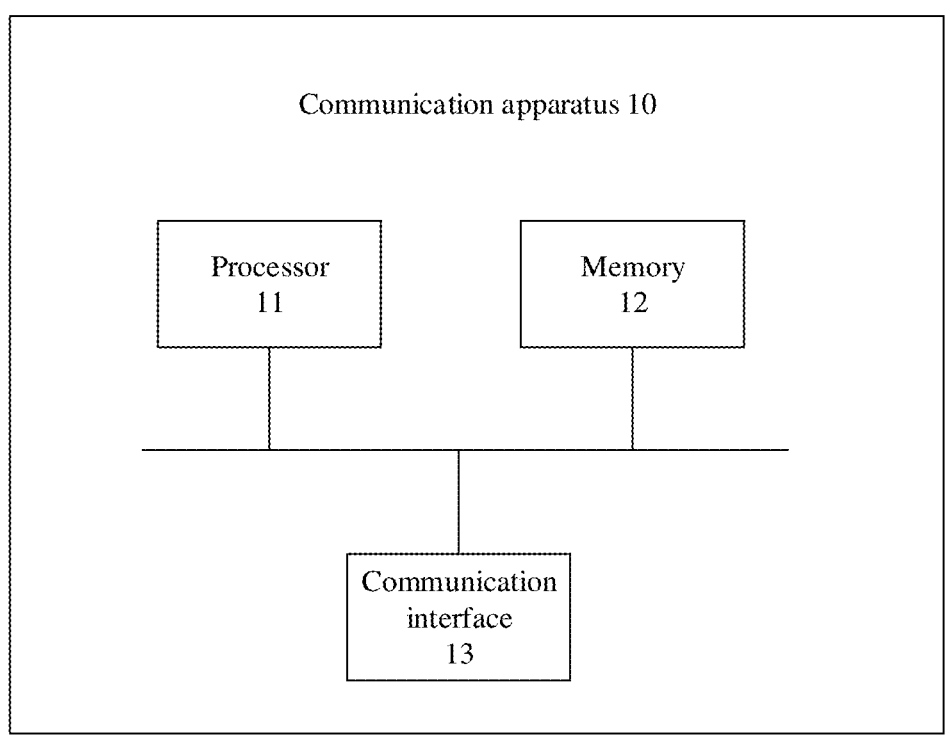
FIG. 13 is a schematic diagram of a structure of a communication apparatus according to this application.

FIG. 13 is a schematic diagram of a structure of a communication apparatus according to this application. As shown in FIG. 13, a communication apparatus 10 includes one or more processors 11, one or more memories 12, and one or more communication interfaces 13. The processor 11 is configured to control the communication interface 13 to receive/send a signal. The memory 12 is configured to store a computer program. The processor 11 is configured to invoke the computer program from the memory 12 and run the computer program, so that the procedures and/or operations performed by the positioning device in the method embodiments of this application are performed.

For example, the processor 11 may have a function of the processing unit 1300 shown in FIG. 10, and the communication interface 13 may have a function of the receiving unit 1100 and/or the sending unit 1200 shown in FIG. 10. Specifically, the processor 11 may be configured to perform processing or operations internally performed by the positioning device in FIG. 1 to FIG. 9, and the communication interface 13 is configured to perform sending actions and/or receiving actions performed by the positioning device in FIG. 1 to FIG. 9.

In an implementation, the communication apparatus 10 may be the positioning device in the method embodiment. In this implementation, the communication interface 13 may be a transceiver. The transceiver may include a receiver and a transmitter.

Optionally, the processor 11 may be a baseband apparatus, and the communication interface 13 may be a radio frequency apparatus.

In another implementation, the communication apparatus 10 may be a chip installed in the access network device. In this implementation, the communication interface 13 may be an interface circuit or an input/output interface.

Figure 14:
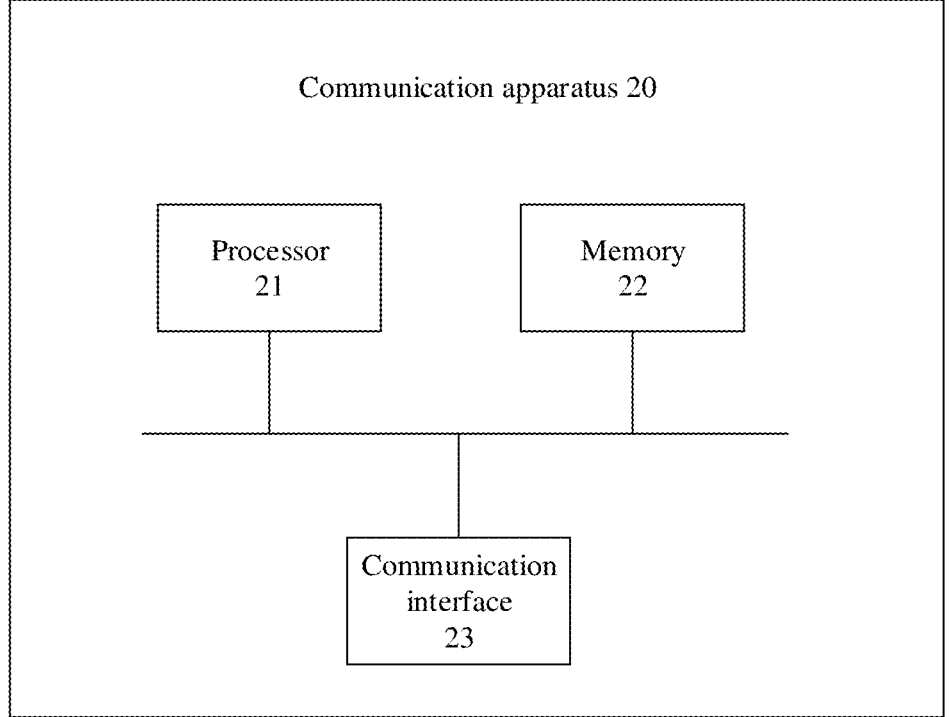
FIG. 14 is a schematic diagram of a structure of another communication apparatus according to this application.

FIG. 14 is a schematic diagram of a structure of a communication apparatus according to this application. As shown in FIG. 14, a communication apparatus 20 includes one or more processors 21, one or more memories 22, and one or more communication interfaces 23. The processor 21 is configured to control the communication interface 23 to receive/send a signal. The memory 22 is configured to store a computer program. The processor 21 is configured to invoke the computer program from the memory 22 and run the computer program, so that the procedures and/or operations performed by the terminal device in the method embodiments of this application are performed.

For example, the processor 21 may have a function of the processing unit 2300 shown in FIG. 11, and the communication interface 23 may have a function of the receiving unit 2100 and/or the sending unit 2200 shown in FIG. 11. Specifically, the processor 21 may be configured to perform processing or operations internally performed by the terminal device in FIG. 1 to FIG. 9, and the communication interface 23 is configured to perform sending actions and/or receiving actions performed by the terminal device in FIG. 1 to FIG. 9. Details are not described again.

Figure 15:
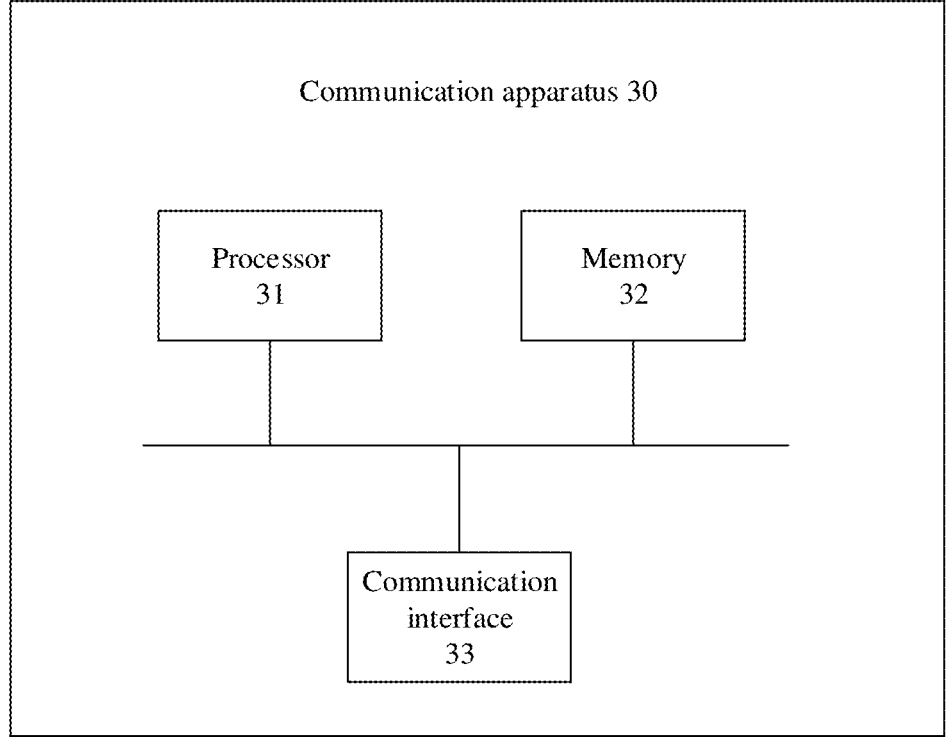
FIG. 15 is a schematic diagram of a structure of another communication apparatus according to this application.

FIG. 15 is a schematic diagram of a structure of a communication apparatus according to this application. As shown in FIG. 15, a communication apparatus 30 includes one or more processors 31, one or more memories 32, and one or more communication interfaces 33. The processor 31 is configured to control the communication interface 33 to receive/send a signal. The memory 32 is configured to store a computer program. The processor 31 is configured to invoke the computer program from the memory 32 and run the computer program, so that the procedures and/or operations performed by the access network device in the method embodiments of this application are performed.

For example, the processor 31 may have a function of the processing unit 3300 shown in FIG. 12, and the communication interface 33 may have a function of the receiving unit 3100 and/or the sending unit 3200 shown in FIG. 12. Specifically, the processor 31 may be configured to perform processing or operations internally performed by the access network device in FIG. 1 to FIG. 9, and the communication interface 33 is configured to perform sending actions and/or receiving actions performed by the access network device in FIG. 1 to FIG. 9. Details are not described again.

Optionally, the memory and the memory in the foregoing apparatus embodiments may be physically independent units, or the memory may be integrated with the processor. This is not limited in this specification.

In addition, this application further provides a computer-readable storage medium. The computer-readable storage medium stores computer instructions. When the computer instructions are run on a computer, the operations and/or procedures performed by the positioning device in the method embodiments of this application are performed.

This application further provides a computer-readable storage medium. The computer-readable storage medium stores computer instructions. When the computer instructions are run on a computer, the operations and/or procedures performed by the terminal device in the method embodiments of this application are performed.

This application further provides a computer-readable storage medium. The computer-readable storage medium stores computer instructions. When the computer instructions are run on a computer, the operations and/or procedures performed by the access network device in the method embodiments of this application are performed.

This application further provides a computer program product. The computer program product includes computer program code or instructions. When the computer program code or the instructions is/are run on a computer, the operations and/or procedures performed by the positioning device in the method embodiments of this application are performed.

This application further provides a computer program product. The computer program product includes computer program code or instructions. When the computer program code or the instructions is/are run on a computer, the operations and/or procedures performed by the terminal device in the method embodiments of this application are performed.

This application further provides a computer program product. The computer program product includes computer program code or instructions. When the computer program code or the instructions is/are run on a computer, the operations and/or procedures performed by the access network device in the method embodiments of this application are performed.

In addition, this application further provides a chip. The chip includes a processor. A memory configured to store a computer program is disposed independent of the chip. The processor is configured to execute the computer program stored in the memory, so that a network device in which the chip is installed performs the operation and/or processing performed by the positioning device in any method embodiment.

Further, the chip may include a communication interface. The communication interface may be an input/output interface, an interface circuit, or the like. Further, the chip may include the memory.

This application further provides a chip. The chip includes a processor. A memory configured to store a computer program is disposed independent of the chip. The processor is configured to execute the computer program stored in the memory, so that a terminal device in which the chip is installed performs the operation and/or processing performed by the terminal device in any method embodiment.

Further, the chip may include a communication interface. The communication interface may be an input/output interface, an interface circuit, or the like. Further, the chip may include the memory.

This application further provides a chip. The chip includes a processor. A memory configured to store a computer program is disposed independent of the chip. The processor is configured to execute the computer program stored in the memory, so that a network device in which the chip is installed performs the operation and/or processing performed by the access network device in any method embodiment.

Further, the chip may include a communication interface. The communication interface may be an input/output interface, an interface circuit, or the like. Further, the chip may include the memory.

In addition, this application further provides a communication apparatus (for example, a chip), including a logic circuit and a communication interface. The communication interface is configured to receive a signal and transmit the signal to the logic circuit. The logic circuit processes the signal, so that the operation and/or processing performed by the positioning device in any method embodiment are/is performed.

This application further provides a communication apparatus (for example, a chip), including a logic circuit and a communication interface. The communication interface is configured to receive a signal and transmit the signal to the logic circuit. The logic circuit processes the signal, so that the operation and/or processing performed by the terminal device in any method embodiment are/is performed.

This application further provides a communication apparatus (for example, a chip), including a logic circuit and a communication interface. The communication interface is configured to receive a signal and transmit the signal to the logic circuit. The logic circuit processes the signal, so that the operation and/or processing performed by the access network device in any method embodiment are/is performed.

In addition, this application further provides a communication apparatus, including at least one processor. The at least one processor is coupled to at least one memory. The at least one processor is configured to execute a computer program or instructions stored in the at least one memory, so that the operation and/or processing performed by the positioning device in any method embodiment are/is performed.

This application further provides a communication apparatus, including at least one processor. The at least one processor is coupled to at least one memory. The at least one processor is configured to execute a computer program or instructions stored in the at least one memory, so that the operation and/or processing performed by the terminal device in any method embodiment are/is performed.

This application further provides a communication apparatus, including at least one processor. The at least one processor is coupled to at least one memory. The at least one processor is configured to execute a computer program or instructions stored in the at least one memory, so that the operation and/or processing performed by the access network device in any method embodiment are/is performed.

In addition, this application further provides a communication device, including a processor, a memory, and a transceiver. The memory is configured to store a computer program. The processor is configured to: invoke and run the computer program stored in the memory, and control the transceiver to receive/send a signal, so that the terminal device performs the operation and/or processing performed by the positioning device in any method embodiment.

This application further provides a communication device, including a processor, a memory, and a transceiver. The memory is configured to store a computer program. The processor is configured to: invoke and run the computer program stored in the memory, and control the transceiver to receive/send a signal, so that the terminal device performs the operation and/or processing performed by the network device in any method embodiment.

This application further provides a communication device, including a processor, a memory, and a transceiver. The memory is configured to store a computer program. The processor is configured to: invoke and run the computer program stored in the memory, and control the transceiver to receive/send a signal, so that the terminal device performs the operation and/or processing performed by the positioning device in any method embodiment.

This application further provides a communication device, including a processor, a memory, and a transceiver. The memory is configured to store a computer program. The processor is configured to: invoke and run the computer program stored in the memory, and control the transceiver to receive/send a signal, so that the communication device performs the operation and/or processing performed by the access network device in any method embodiment.

In addition, this application further provides a wireless communication system, including one or more of a positioning device, a terminal device, and an access network device in embodiments of this application.

The processor in embodiments of this application may be an integrated circuit chip, and has a signal processing capability. In an implementation process, steps in the foregoing method embodiments may be implemented by using a hardware integrated logic circuit in the processor, or by using instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through examples but not limitative description, RAMs in many forms are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

The term "and/or" in this application indicates only an association relationship for describing associated objects and indicates that three relationships may exist. For example, A and/or B may indicate the following three cases: Only A exists, both A and B exist, and only B exists. A, B, and C each may be singular or plural. This is not limited.

In addition, "a plurality of" in this application means two or more.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
obtaining, by a positioning device, positioning integrity information of a terminal device from an access network device or the terminal device, wherein the positioning integrity information indicates a positioning integrity requirement that is predicted by the access network device or the terminal device and that is of the terminal device in a first scenario; and
performing, by the positioning device based on the positioning integrity information, an operation for positioning the terminal device, to meet the positioning integrity requirement of the terminal device in the first scenario;
wherein the performing, by the positioning device based on the positioning integrity information, the operation for positioning the terminal device comprises:
determining, by the positioning device, whether the positioning integrity requirement of the terminal device in the first scenario changes relative to a positioning integrity requirement of the terminal device in a second scenario, wherein the second scenario is a scenario in which the terminal device is located before the positioning device positions the terminal device for the first scenario; and
in response to the positioning integrity requirement of the terminal device in the first scenario changing relative to the positioning integrity requirement of the terminal device in the second scenario, performing, by the positioning device, the operation for positioning the terminal device based on the positioning integrity requirement that is indicated by the positioning integrity information and that is of the terminal device in the first scenario.

2. The method according to claim 1, wherein the performing, by the positioning device, the operation for positioning the terminal device based on the positioning integrity requirement that is indicated by the positioning integrity information and that is of the terminal device in the first scenario comprises performing at least one of the following operations:
changing a positioning algorithm used for positioning the terminal device, wherein a changed positioning algorithm comprises one or more of an uplink time difference of arrival based positioning method, a downlink time difference of arrival based positioning method, an uplink angle of arrival based positioning method, a downlink angle of departure based positioning method, a round trip time based positioning method, an enhanced cell identifier-based positioning method, a global navigation satellite system based positioning method, a terrestrial beacon system based positioning method, a barometric pressure sensor based positioning method, a wireless local area network based positioning method, a Bluetooth based positioning method, or a motion based positioning method;
changing configuration information of a positioning reference signal;
ending a positioning procedure; or
adding or changing a reference station for positioning the terminal device.

3. The method according to claim 1, wherein the obtaining, the positioning device, positioning integrity information of the terminal device from the access network device or the terminal device comprises:
sending, by the positioning device, a request assistance data message to the access network device, wherein the request assistance data message is used to request assistance data required for positioning the terminal device; and
receiving, by the positioning device, a provide assistance data message from the access network device, wherein the provide assistance data message carries the positioning integrity information; and/or
sending, by the positioning device, a request location information message to the terminal device, wherein the request location information message is used to request location information of the terminal device or a measurement amount for location calculation; and
receiving, by the positioning device, a provide location information message from the terminal device, wherein the provide location information message carries the positioning integrity information; and/or
obtaining, by the positioning device, the positioning integrity information of the terminal device from the outside.

4. The method according to claim 1, wherein the positioning integrity information comprises one or more pieces of the following information:
input data of the first scenario, wherein the input data of the first scenario comprises one or more of the following: an environment, a time, and a location of the to-be-positioned terminal device; or
positioning integrity result information, wherein the positioning integrity result information comprises one or more of information about whether an integrity risk occurs, a positioning error, and an integrity level.

5. The method according to claim 1, wherein a measurement indicator of the positioning integrity requirement indicated by the positioning integrity information comprises one or more of an alert limit, a time to alert, an integrity risk, or a protection level.

6. The method according to claim 1, wherein in response to the positioning integrity requirement of the terminal device in the first scenario changing relative to the positioning integrity requirement of the terminal device in the second scenario, the method further comprises:

sending, by the positioning device, first indication information to the terminal device and/or the access network device, wherein the first indication information indicates the terminal device and/or the access network device to use a positioning method that meets the positioning integrity requirement of the terminal device in the first scenario.

7. The method according to claim 6, wherein the first indication information further indicates one or more of configuration information of a positioning reference signal, ended positioning procedure indication information, or a mapping relationship between positioning integrity requirement information and an influencing factor of positioning integrity.

8. A communication apparatus, comprising:

a processor; and a memory having instructions stored thereon that, when executed by the processor, cause the communication apparatus to:

obtain positioning integrity information of a terminal device from an access network device or the terminal device, wherein the positioning integrity information indicates a positioning integrity requirement that is predicted by the access network device or the terminal device and that is of the terminal device in a first scenario; and perform, based on the positioning integrity information, an operation for positioning the terminal device, to meet the positioning integrity requirement of the terminal device in the first scenario;

wherein the communication apparatus is further caused to:

determine whether the positioning integrity requirement of the terminal device in the first scenario changes relative to a positioning integrity requirement of the terminal device in a second scenario, wherein the second scenario is a scenario in which the terminal device is located before the terminal device is positioned for the first scenario; and in response to the positioning integrity requirement of the terminal device in the first scenario changing relative to the positioning integrity requirement of the terminal device in the second scenario, perform the operation for positioning the terminal device based on the positioning integrity requirement that is indicated by the positioning integrity information and that is of the terminal device in the first scenario.

9. The communication apparatus according to claim 8, wherein the communication apparatus is further caused to:

change a positioning algorithm used for positioning the terminal device, wherein a changed positioning algorithm comprises one or more of an uplink time difference of arrival based positioning method, a downlink time difference of arrival based positioning method, an uplink angle of arrival based positioning method, a downlink angle of departure based positioning method, a round trip time based positioning method, an enhanced cell identifier-based positioning method, a global navigation satellite system based positioning method, a terrestrial beacon system based positioning method, a barometric pressure sensor based positioning method, a wireless local area network based positioning method, a Bluetooth based positioning method, or a motion based positioning method;

change configuration information of a positioning reference signal;

end a positioning procedure; or add or change a reference station for positioning the terminal device.

10. The communication apparatus according to claim 8, wherein the communication apparatus is further caused to:

send a request assistance data message to the access network device, wherein the request assistance data message is used to request assistance data required for positioning the terminal device, wherein receive a provide assistance data message from the access network device, wherein the provide assistance data message carries the positioning integrity information; and/or send a request location information message to the terminal device, wherein the request location information message is used to request location information of the terminal device or a measurement amount for location calculation; and receive a provide location information message from the terminal device, wherein the provide location information message carries the positioning integrity information; and/or obtain the positioning integrity information of the terminal device from the outside.

11. The communication apparatus according to claim 8, wherein the positioning integrity information comprises one or more pieces of the following information:

input data of the first scenario, wherein the input data of the first scenario comprises one or more of the following: an environment, a time, and a location of the to-be-positioned terminal device; or positioning integrity result information, wherein the positioning integrity result information comprises one or more of information about whether an integrity risk occurs, a positioning error, and an integrity level.

12. The communication apparatus according to claim 8, wherein a measurement indicator of the positioning integrity requirement indicated by the positioning integrity information comprises one or more of an alert limit, a time to alert, an integrity risk, or a protection level.

13. The communication apparatus according to claim 8, wherein the communication apparatus is further caused to:

send first indication information to the terminal device and/or the access network device, wherein the first indication information indicates the terminal device and/or the access network device to use a positioning method that meets the positioning integrity requirement of the terminal device in the first scenario.

14. The communication apparatus according to claim 13, wherein the first indication information further indicates one or more of configuration information of a positioning reference signal, ended positioning procedure indication information, or a mapping relationship between positioning integrity requirement information and an influencing factor of positioning integrity.

15. A non-transitory computer storage medium, storing computer instructions that, when executed by a processor, cause an apparatus to:

obtain positioning integrity information of a terminal device from an access network device or the terminal device, wherein the positioning integrity information indicates a positioning integrity requirement that is predicted by the access network device or the terminal device and that is of the terminal device in a first scenario; and perform based on the positioning integrity information, an operation for positioning the terminal device, to meet the positioning integrity requirement of the terminal device in the first scenario;

wherein the apparatus is further caused to:

determine whether the positioning integrity requirement of the terminal device in the first scenario changes relative to a positioning integrity requirement of the terminal device in a second scenario, wherein the second scenario is a scenario in which the terminal device is located before the terminal device is positioned for the first scenario; and in response to the positioning integrity requirement of the terminal device in the first scenario changing relative to the positioning integrity requirement of the terminal device in the second scenario, perform the operation for positioning the terminal device based on the positioning integrity requirement that is indicated by the positioning integrity information and that is of the terminal device in the first scenario.

16. The non-transitory computer storage medium according to claim 15, wherein the apparatus is further caused to:

change a positioning algorithm used for positioning the terminal device, wherein a changed positioning algorithm comprises one or more of an uplink time difference of arrival based positioning method, a downlink time difference of arrival based positioning method, an uplink angle of arrival based positioning method, a downlink angle of departure based positioning method, a round trip time based positioning method, an enhanced cell identifier-based positioning method, a global navigation satellite system based positioning method, a terrestrial beacon system based positioning method, a barometric pressure sensor based positioning method, a wireless local area network based positioning method, a Bluetooth based positioning method, or a motion based positioning method;

change configuration information of a positioning reference signal;

end a positioning procedure; or add or change a reference station for positioning the terminal device.

17. The non-transitory computer storage medium according to claim 15, wherein the apparatus is further caused to:

send a request assistance data message to the access network device, wherein the request assistance data message is used to request assistance data required for positioning the terminal device; and receive a provide assistance data message from the access network device, wherein the provide assistance data message carries the positioning integrity information; and/or send a request location information message to the terminal device, wherein the request location information message is used to request location information of the terminal device or a measurement amount for location calculation; and receive a provide location information message from the terminal device, wherein the provide location information message carries the positioning integrity information; and/or obtain the positioning integrity information of the terminal device from the outside.

* * * * *